US012673684B2

(12) United States Patent
Agrawal et al.

(10) Patent No.: US 12,673,684 B2
(45) Date of Patent: Jul. 7, 2026

(54) REDUCING DISTRACTIONS CAUSED BY SETTING UP A COMMUNICATION SESSION WITH A REMOTE DEVICE THAT IS BEING USED DURING DRIVING

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 134 days.

(21) Appl. No.: 17/816,325

(22) Filed: Jul. 29, 2022

(65) Prior Publication Data

US 2024/0034334 A1    Feb. 1, 2024

(51) Int. Cl.
  B60W 40/09        (2012.01)
  B60W 30/08        (2012.01)
  B60W 40/10        (2012.01)

(52) U.S. Cl.
  CPC ............ B60W 40/09 (2013.01); B60W 30/08 (2013.01); B60W 40/10 (2013.01); *B60W 2540/229* (2020.02)

(58) Field of Classification Search
  CPC ...... B60W 40/09; B60W 30/08; B60W 40/10; B60W 2540/229; B60W 2050/146; B60W 2555/20; B60W 2556/45; B60W 2556/50; B60W 50/14; B60K 35/29
  USPC .......................................................... 701/1
  See application file for complete search history.

(56) References Cited

U.S. PATENT DOCUMENTS

| | | | |
|---|---|---|---|
| 9,875,734 B2 | 1/2018 | Agrawal et al. | |
| 11,297,332 B1 * | 4/2022 | Walters | ................ G06N 3/0464 |
| 2003/0134660 A1 * | 7/2003 | Himmel | .......... H04M 1/724098 |
| | | | 455/557 |
| 2004/0063472 A1 * | 4/2004 | Shimizu | .............. H04M 1/6091 |
| | | | 455/569.1 |
| 2010/0310063 A1 * | 12/2010 | Moon | .................. H04M 3/4211 |
| | | | 379/215.01 |
| 2011/0050460 A1 | 3/2011 | Bruns et al. | |

(Continued)

*Primary Examiner* — Hitesh Patel
*Assistant Examiner* — Ashleigh Nicole Trunbaugh
(74) *Attorney, Agent, or Firm* — Isidore PLLC

(57)        ABSTRACT

An electronic system, a method, and a computer program product support wireless communication with reduced distraction for a driver experiencing challenging driving conditions. The method includes initiating setup of a communication session by the electronic system as host, via the communication subsystem and the communication network, with a first electronic device and second electronic device(s). In response to determining that the first electronic device is being used by a driver in a vehicle, the method includes pausing setup of the communication session to reduce distractions to the driver when potentially in a challenging driving condition. The method includes requesting data about the first electronic device that indicates whether current driving conditions allow the driver to communicate without degrading driving performance. The method includes completing setup of the communication session in response to verifying that the driver is able to communicate while safely operating the vehicle under the current driving conditions.

20 Claims, 10 Drawing Sheets

(56)         References Cited

U.S. PATENT DOCUMENTS

| | | | | |
|---|---|---|---|---|
| 2014/0004833 A1* | 1/2014 | Kiddie | ................. | H04W 4/029 |
| | | | | 455/418 |
| 2015/0056973 A1* | 2/2015 | Efrati | ............... | H04M 1/72463 |
| | | | | 455/418 |
| 2016/0374004 A1* | 12/2016 | Silver | ................. | H04W 4/027 |
| 2017/0134565 A1* | 5/2017 | Crowe | ................. | H04W 4/027 |
| 2018/0162275 A1* | 6/2018 | Pedersen | ............... | B60Q 9/008 |
| 2022/0159432 A1* | 5/2022 | Crawford | ............... | H04W 4/48 |
| 2022/0201481 A1 | 6/2022 | Martindale et al. | | |
| 2023/0101411 A1* | 3/2023 | Mirdha | ............. | G01C 21/3461 |
| | | | | 345/629 |
| 2023/0350547 A1* | 11/2023 | Han | ...................... | G06F 3/0484 |

* cited by examiner

300

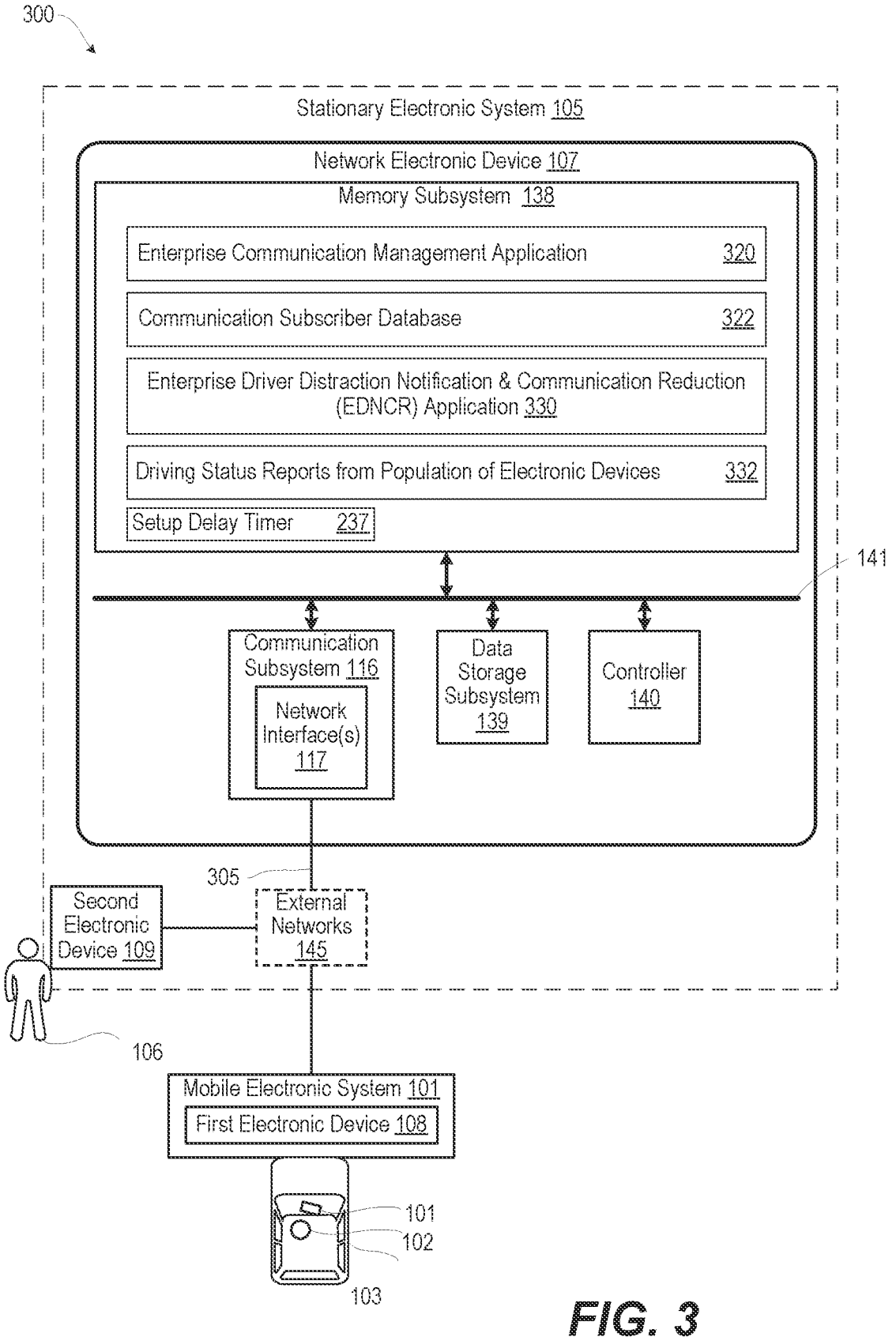

Stationary Electronic System 105

Network Electronic Device 107

Memory Subsystem 138

| Enterprise Communication Management Application | 320 |
| --- | --- |

| Communication Subscriber Database | 322 |
| --- | --- |

Enterprise Driver Distraction Notification & Communication Reduction (EDNCR) Application 330

| Driving Status Reports from Population of Electronic Devices | 332 |
| --- | --- |

| Setup Delay Timer | 237 |
| --- | --- |

141

Communication Subsystem 116

Network Interface(s) 117

Data Storage Subsystem 139

Controller 140

305

Second Electronic Device 109

External Networks 145

106

Mobile Electronic System 101

First Electronic Device 108

Identify driver looking at a camera

501b

Identify driver looking out of windshield

501c

Identify normal driving conditions

501d

Identify stressful driving conditions

501e

Identify driver having normal expression and posture and speaking calmly

501f

Identify driver having a stressed expression, posture, and/or voice

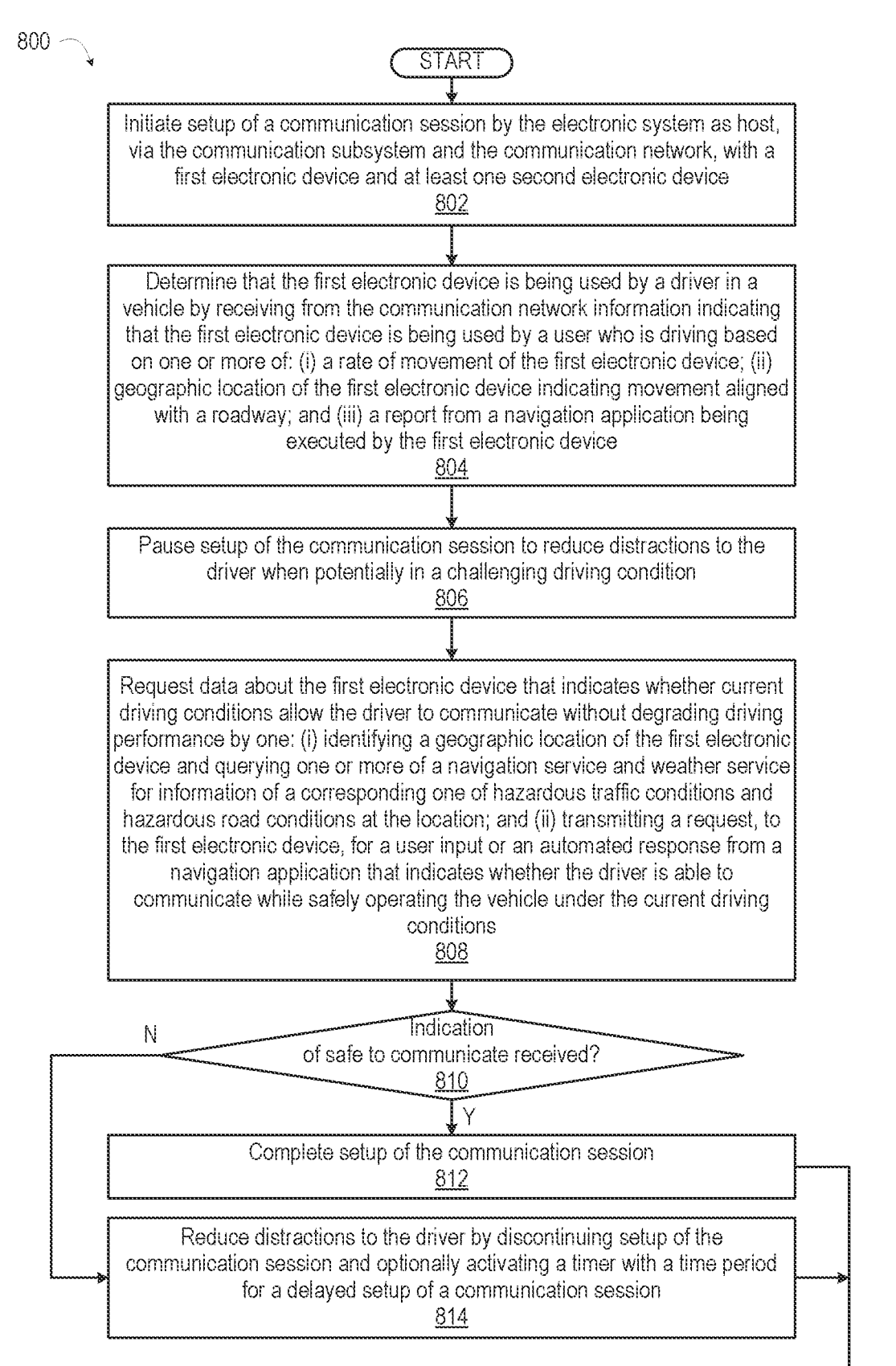

800

START

Initiate setup of a communication session by the electronic system as host, via the communication subsystem and the communication network, with a first electronic device and at least one second electronic device
802

Determine that the first electronic device is being used by a driver in a vehicle by receiving from the communication network information indicating that the first electronic device is being used by a user who is driving based on one or more of: (i) a rate of movement of the first electronic device; (ii) geographic location of the first electronic device indicating movement aligned with a roadway; and (iii) a report from a navigation application being executed by the first electronic device
804

Pause setup of the communication session to reduce distractions to the driver when potentially in a challenging driving condition
806

Request data about the first electronic device that indicates whether current driving conditions allow the driver to communicate without degrading driving performance by one: (i) identifying a geographic location of the first electronic device and querying one or more of a navigation service and weather service for information of a corresponding one of hazardous traffic conditions and hazardous road conditions at the location; and (ii) transmitting a request, to the first electronic device, for a user input or an automated response from a navigation application that indicates whether the driver is able to communicate while safely operating the vehicle under the current driving conditions
808

N          Indication
of safe to communicate received?
810

Y

Complete setup of the communication session
812

Reduce distractions to the driver by discontinuing setup of the communication session and optionally activating a timer with a time period for a delayed setup of a communication session
814

End

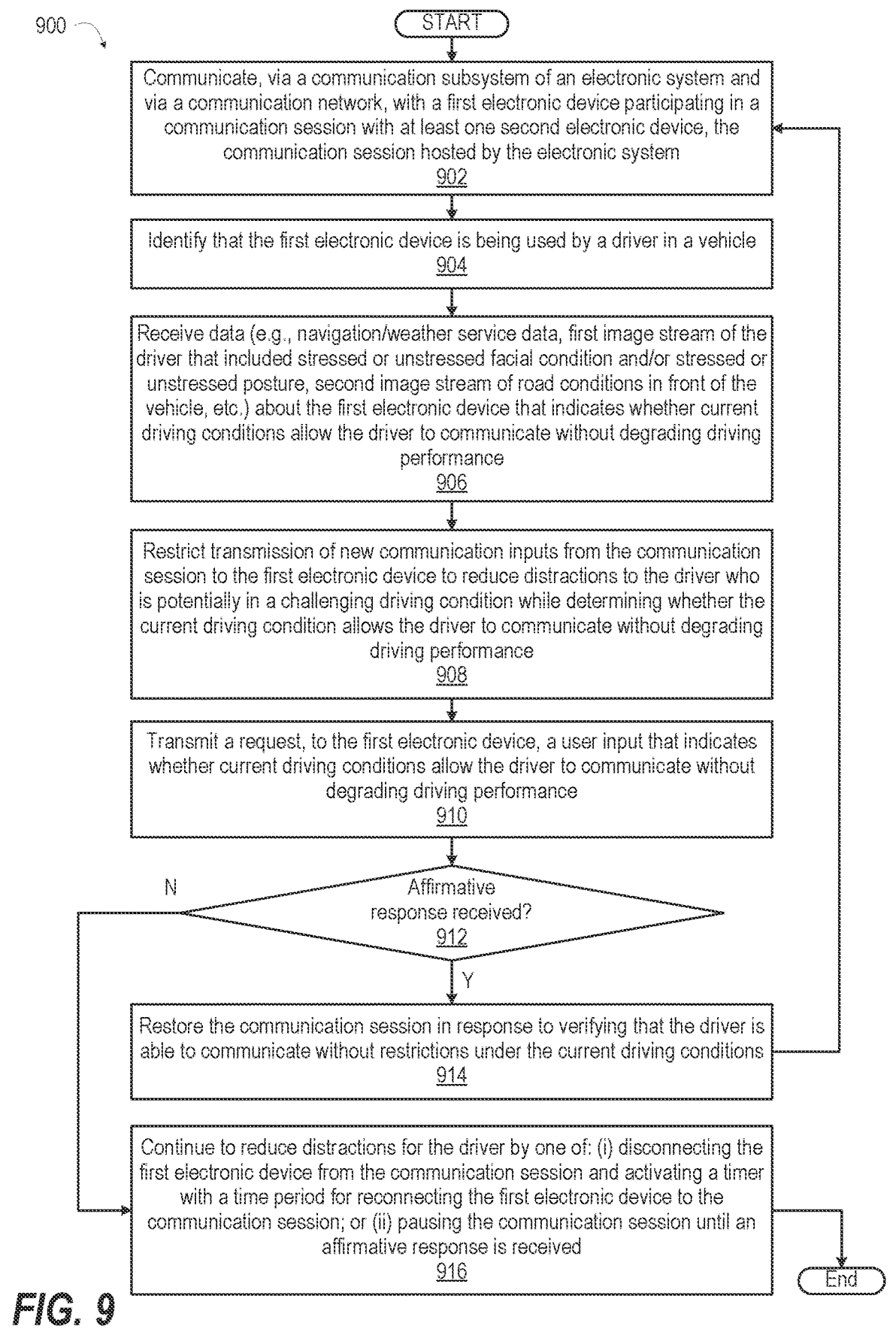

( START )

Communicate, via a communication subsystem of an electronic system and via a communication network, with a first electronic device participating in a communication session with at least one second electronic device, the communication session hosted by the electronic system
902

Identify that the first electronic device is being used by a driver in a vehicle
904

Receive data (e.g., navigation/weather service data, first image stream of the driver that included stressed or unstressed facial condition and/or stressed or unstressed posture, second image stream of road conditions in front of the vehicle, etc.) about the first electronic device that indicates whether current driving conditions allow the driver to communicate without degrading driving performance
906

Restrict transmission of new communication inputs from the communication session to the first electronic device to reduce distractions to the driver who is potentially in a challenging driving condition while determining whether the current driving condition allows the driver to communicate without degrading driving performance
908

Transmit a request, to the first electronic device, a user input that indicates whether current driving conditions allow the driver to communicate without degrading driving performance
910

N      Affirmative response received?
912

Y

Restore the communication session in response to verifying that the driver is able to communicate without restrictions under the current driving conditions
914

Continue to reduce distractions for the driver by one of: (i) disconnecting the first electronic device from the communication session and activating a timer with a time period for reconnecting the first electronic device to the communication session; or (ii) pausing the communication session until an affirmative response is received
916

( End )

FIG. 9

REDUCING DISTRACTIONS CAUSED BY SETTING UP A COMMUNICATION SESSION WITH A REMOTE DEVICE THAT IS BEING USED DURING DRIVING

RELATED APPLICATIONS

The present application is related to the following co-pending U.S. patent application Ser. No. 17/816,225 entitled "Driving Condition Detection And Indication To A Remote Device During A Communication Session" and Ser. No. 17/816,307 entitled "Reducing Distractions Caused By A Communication Session With A Remote Device That Is Used During Driving", both filed concurrently herewith, with relevant content of each related application being incorporated herein by reference.

BACKGROUND

1. Technical Field

The present disclosure relates generally to a mobile communication system and more particularly to video communication systems used in a vehicle.

2. Description of the Related Art

Electronic devices such as mobile phones, network servers, desktop workstations, laptops, and tablets are often used to participate in or to enable online human communication, such as a video communication session. So as to simulate an in-person conversation, meeting, or lecture, each participant in a video communication session generally positions themself within the field of view of the local camera and within detection range of the microphone. The respective image stream and audio stream captured by a first electronic device are communicated to the video communication session for presentation by one or more second electronic devices. Recent trends are for increased use of video communications in a wide range of settings including homes and public spaces. Additionally, some participants use their electronics devices to participate in a video communication session from within a vehicle and while driving.

When a driver is driving a vehicle with a passenger, in-person conversations are typically conducted in a holistic manner by understanding and reacting to the environment the vehicle is in. For example, if the vehicle in front slams on the brakes, the passenger would not continue speaking to avoid disturbing the driver who needs to be attentive to driving the vehicle. Similarly, the passenger would be aware when a challenging driving condition exists due to road conditions, impaired visibility, and proximity to pedestrians. By contrast, when the driver is participating in audio or video communication session via an electronic device, the other participants in the communication session would have no knowledge of the challenging driving conditions and may unknowingly distract the driver.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 3 depicts an example network electronic device that is configured to facilitate communication between electronic devices and to provide driver distraction notification and implement communication reduction functions, according to one or more embodiments;

FIG. 8 presents a flow diagram of a method of reducing driver distractions during setup of a communication session with a remote mobile electronic system used by a driver operating a vehicle in challenging driving conditions, according to one or more embodiments; and FIG. 9 presents a flow diagram of a method of reducing driver distractions during an ongoing communication session with a remote mobile electronic system used by a driver operating a vehicle in challenging driving conditions, according to one or more embodiments.

DETAILED DESCRIPTION

Figure 1:
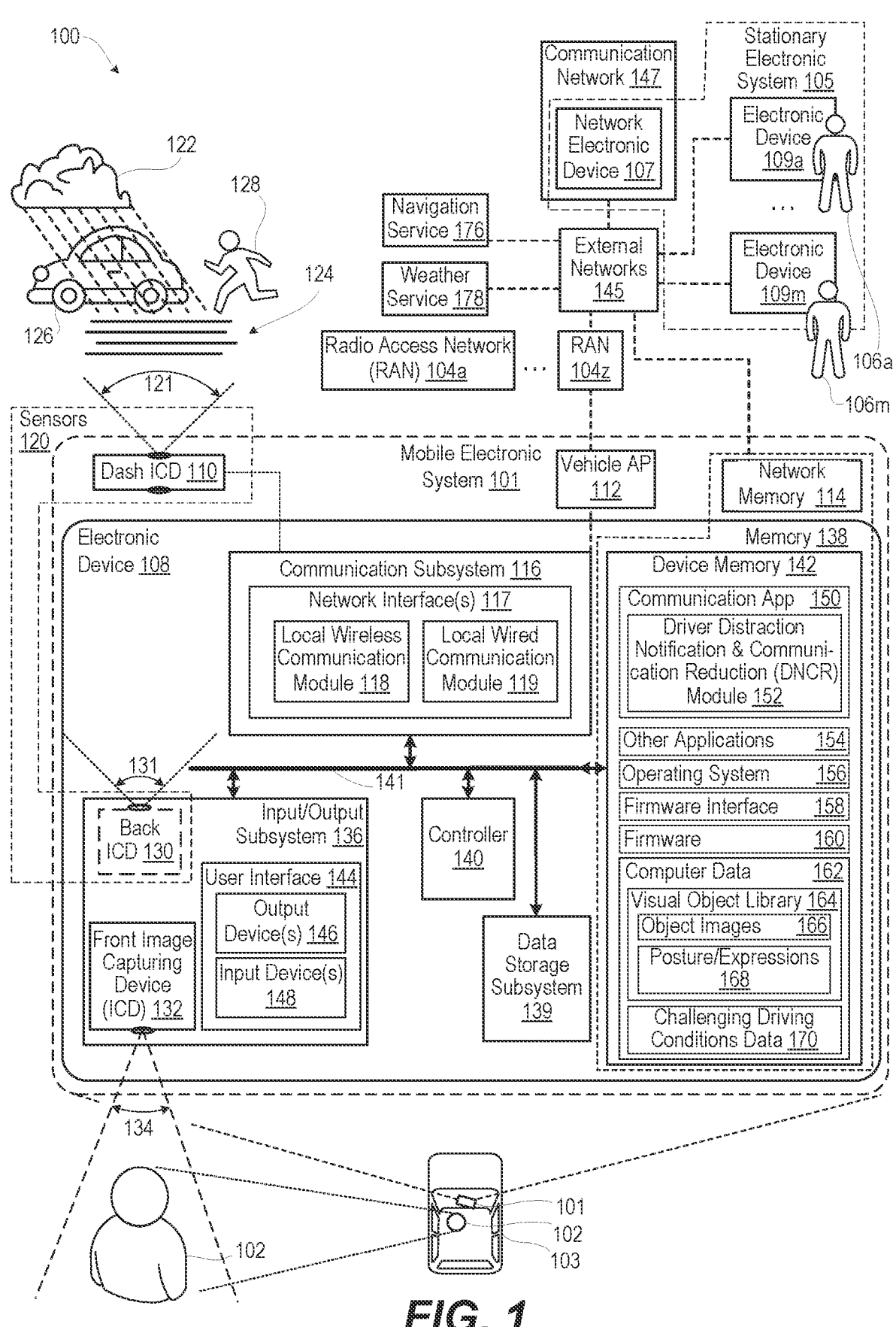
FIG. 1 depicts a functional block diagram of a communication environment having a mobile electronic system used by a driver to communicate, via radio access networks (RANs), with a stationary electronic system that facilitates a video communication session with a remote participant, according to one or more embodiments.

According to aspects of the present disclosure, an electronic system, a method, and a computer program product facilitates delaying the establishment of wireless communication in order to reduced distractions for a driver experiencing challenging driving conditions. The electronic system includes a communication subsystem connectable to a communication network and a controller communicatively connected to the communication subsystem. The controller initiates setup, via the communication subsystem and the communication network, of a communication session with a first electronic device and at least one second electronic device, with the electronic system serving as host. In response to determining that the first electronic device is being used by a driver in a vehicle, the controller pauses setup of the communication session to reduce distractions to the driver when the driver is determined to be potentially operating the vehicle in a challenging driving condition. The controller requests data about the first electronic device that indicates whether current driving conditions allow the driver to communicate without degrading driving performance. The controller completes setup of the communication session in response to verifying that the driver is able to communicate while safely operating the vehicle under the current driving conditions.

In one or more embodiments, the electronic system manages driving distraction of a remote user during device call setup. The electronic system determines that a second user is initiating an audio or video communication with a remote user. The electronic system determines that there is an indication that the remote user is driving. The electronic system initiates a request to the remote device to receive additional information regarding the remote user's distraction status, for example, one of "remote user occupied" and "safe to communicate". The electronic system sets up the communication session when the distraction indication is "safe to communicate". The electronic system provides an option to initiate an automatic call initiation when the distraction situation improves for the remote user and the remote user is ready to communicate.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of communication environment 100 including a mobile electronic system 101 used by first participant ("driver") 102 in vehicle 103 to communicate, via radio access networks (RANs) 104a-104z, with stationary electronic system 105. Stationary electronic system 105 includes one or more network electronic devices 107 (e.g., network servers) that provide network communication hosting services includes second electronic devices 109a-109m used by corresponding second participants 106a-106m. Communication environment 100 provides an operating environment within which the features of the present disclosure are advantageously implemented. In particular, these features include reducing distractions to driver 102 during challenging driving conditions that may exist during setup of or ongoing communication session. In one or more embodiments, mobile electronic system 101 consists essentially of first electronic device 108, which is capable of communicating with RANs 104a-104z. Each participant (first participant or driver 102, and second participants 106a-106m) may participate in the communication session via a corresponding electronic device (first electronic device 108 and second electronic devices 109a-109m).

First electronic device 108 can be one of a host of different types of devices, including but not limited to, an infant monitoring system, a mobile cellular phone, satellite phone, or smart-phone, a laptop, a net-book, an ultra-book, a networked smart watch, networked sports/exercise watch, and/or a tablet computing device or similar device. As more completely presented as communication device 208 of FIG. 2, which is described hereafter, electronic device 108 can also be a device supporting wireless communication. In these implementations, electronic device 108 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 108 are for example only, and not intended to be limiting on the disclosure.

Referring now to the specific component makeup and the associated functionality of the presented components, in one or more embodiments, mobile electronic system 101 is augmented by additional devices such as a ("dashcam") dash image capturing device (ICD) 110, vehicle access point (AP) 112, and external memory such as network memory 114. In an example, first electronic device 108 is configured with the ability to communicatively connect via communication subsystem 116 to the vehicle AP 112 via one or more network interfaces 117, such as low power local wireless communication module 118 and local wired communication module 119.

In one or more embodiments, mobile electronic system 101 includes one or more sensors 120 that can detect challenging driving conditions created by adverse weather 122 (e.g., wind and precipitation), poor road conditions 124 (e.g., incline, slick, rough, etc.), crowded traffic conditions 126, and pedestrian traffic conditions 128. In one embodiment, the one or more sensors 120 include dash ICD 110 that has forward field of view (FOV) 121. In another embodiment, the one or more sensors 120 include back ICD 130 of first electronic device 108 that has forward FOV 131. In yet another embodiment, the one or more sensors 120 are in-vehicle sensors that a communicatively connected to the vehicle computer, which communicates the sensor detected data to controller 140 of mobile electronic system 101 via a wireless or USB connection (e.g., vehicle access point (AP) 112). Dash ICD 110 and back ICD 130 may provide two-dimensional or three-dimensional image data in the visual or infrared spectrums. Dash ICD 110 and back ICD 130 may include range finding, such as provided by stereo cameras, a radar or lidar sensor. In one or more embodiments, mobile electronic system 101 includes at least one ICD positioned to capture a face and posture of driver 102. In an example, dash ICD 110 may include dual cameras, with a rear camera facing the rear of the dash cam device towards the driver. In another example, first electronic device 108 includes front ICD 132 having FOV 134 that is positioned toward driver 102.

Back ICD 130 and front ICD 132 are part of input/output subsystem 136 of first electronic system 101. In addition to communication subsystem 116 and input/output subsystem 136, first electronic device 108 includes memory subsystem 138 and data storage subsystem 139 that are managed by controller 140. Controller 140 may be communicatively connected to communication subsystem 116 and input/output subsystem 136, memory subsystem 138 and data storage subsystem 139 via system interlink 141. In an example, memory subsystem 138 includes network memory 114 that is external to first electronic device 108 and includes device memory 142 that is internal to first electronic device

108. In one or more embodiments, input/output subsystem provides user interface devices 144 including one or more output devices 146 and one or more input devices 148. User interface devices 144 may enable user interaction with first electronic device 108 using inputs and outputs that are one or more of visual, haptic, touch, sound, gesture, etc.

Device memory 142 includes program code for applications, such as communication application 150 that includes driver distraction notification and communication reduction (DNCR) module 152 and other applications 154. In one or more embodiments, DNCR module 152 is a suite of applications, utilities, components, or modules that configure first electronic device 108 to monitor and/or detect and/or determine challenging driving conditions and provide mitigations for reducing distractions to driver 102. Device memory 142 further includes operating system (OS) 156, firmware interface 158, such as basic input/output system (BIOS) or Uniform Extensible Firmware Interface (UEFI), and firmware 160. Device memory 142 stores computer data 162 that is used by DNCR module 152. Computer data 162 includes visual object library 164 that stores object images 166 and facial expressions 168 for recognizing challenging driving conditions. Computer data 162 may also include challenging driving conditions data 170 that is provided to stationary electronic system 105.

Figure 2:
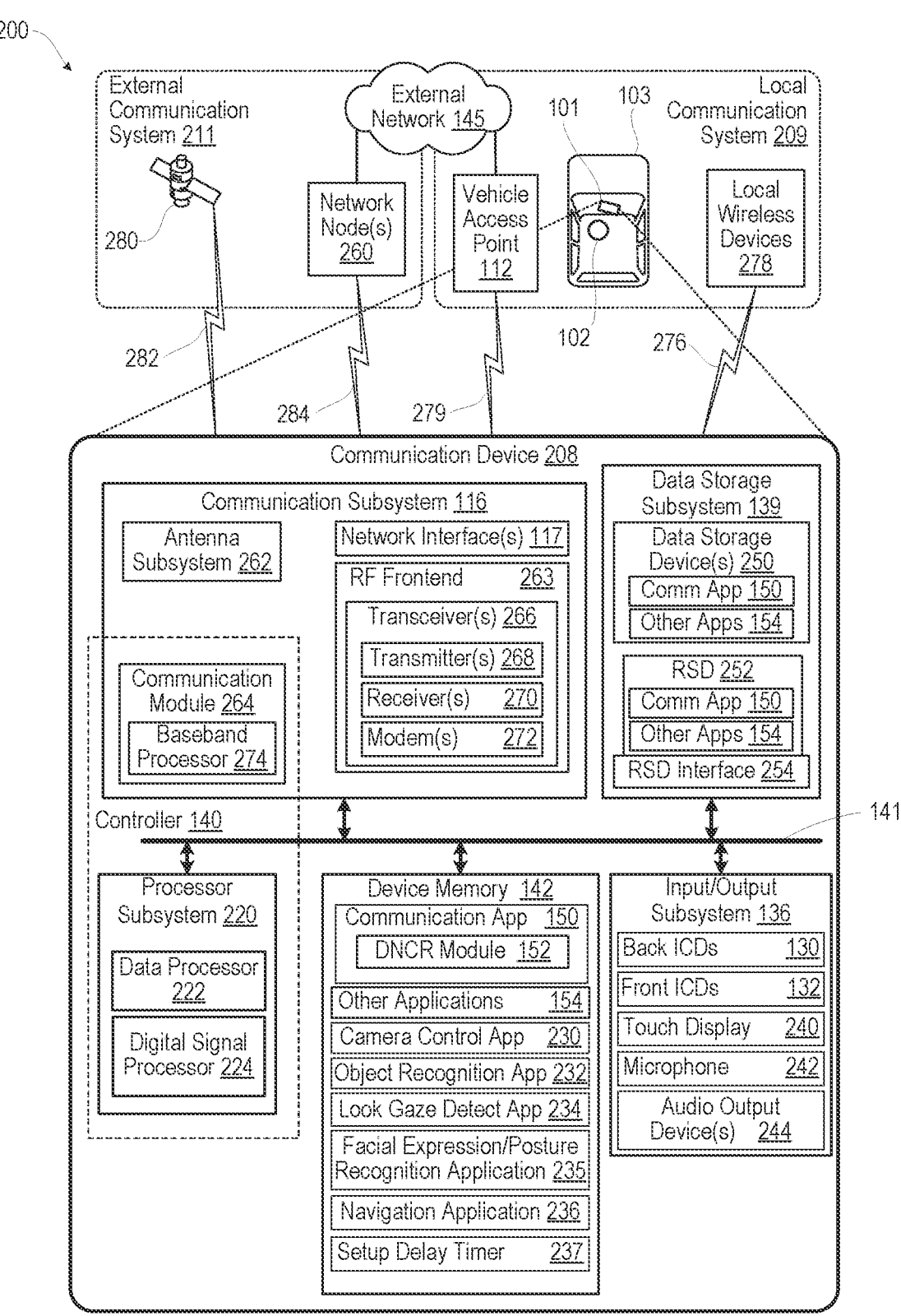
FIG. 2 depicts an example electronic device that is configured as a communication device to communicate with RANs and other wireless devices and to limit distractions to a driver during setup of or an ongoing communication session with remote participant(s) in response to identifying challenging driving conditions, according to one or more embodiments.

In one or more embodiments, the communication session may be one-on-one between driver 102 using electronic device 108 of mobile electronic system 101 and one second participant 106*a* using ("second") electronic device 109*a*. The RANs 104*a*-104*z* connect the ("first") mobile electronic system 101 to the ("second") stationary system 105 via external network 145. Electronic system 101 and stationary system 105 may access other systems such as navigation service 176 and weather service 178 via external networks 145. The communication session may be multiparty between driver 102 using electronic device 108 and more than one second participant 106*a*-106*m*, each using a corresponding ("second") electronic device 109*a*-109*m*. In one or more embodiments, the communication session may be assisted by network electronic device(s) 146 of communication network 147. Each second electronic device 109*a*-109*m* may include the same or similar components described for first electronic device 108 or communication device 208 (FIG. 2). Each electronic device 108 and 109*a*-109*m* may originate audio and/or video that is provided to the communication session. Each electronic device 108 and 109*a*-109*m* may receive audio and/or video from the communication session that originates at one or more other electronic devices 108 and 109*a*-109*m*.

FIG. 2 is a functional block diagram of communication environment 200 in which communication device 208, operating as a host device for a communication session, communicates with an in-vehicle communication system 209 that is integrated within and moves with vehicle 103 and with external communication system 211 that is external to vehicle 103. Communication device 208 is an implementation of first electronic device 108 (FIG. 1). Communication device 208 includes communication subsystem 116, input/output subsystem 136, data storage subsystem 139, controller 140, and device memory 142 as previously described but having additional functionality.

Controller 140 includes processor subsystem 220, which executes program code to provide operating functionality of communication device 208. Controller 140 manages, and in some instances directly controls, the various functions and/or operations of communication device 208. These functions and/or operations include, but are not limited to including, application data processing, communication with second communication devices, navigation tasks, image processing, and signal processing. In one or more alternate embodiments, communication device 208 may use hardware component equivalents for application data processing and signal processing. For example, communication device 208 may use special purpose hardware, dedicated processors, general purpose computers, microprocessor-based computers, micro-controllers, optical computers, analog computers, dedicated processors and/or dedicated hard-wired logic.

The software and/or firmware modules executed by processor subsystem 220 have varying functionality when their corresponding program code is executed by data processor(s) 222 or secondary processing devices within communication device 208 such as digital signal processor 224. Processor subsystem 220 can include other processors that are communicatively coupled internally or externally to data processor 222. Data processor 222 is communicatively coupled, via system interlink 141, to data storage subsystem 139 and device memory 142. System interlink 141 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 141) are illustrated in FIG. 1, it is to be understood that more, fewer, or different interconnections may be present in other embodiments.

Processor subsystem 220 of controller 140 can execute program code of DNCR module 152 to configure communication device 208 to perform specific functions for recognizing challenging driving conditions. In an example, DNCR module 152 can include or utilize camera control application 230, object recognition application 232, look gaze detect application 234, facial expression/posture recognition application 235, navigation application 236, and setup delay timer 237. Processor subsystem 220 receives data from certain components of input/output subsystem 136 and presents data on certain components of input/output subsystem 136. In an example, input/output subsystem 136 includes back ICDs 130, front ICDs 132, touch display 240, microphone 242, and audio output device(s) 244.

Data storage subsystem 139 of communication device 208 includes data storage device(s) 160. Controller 140 is communicatively connected, via system interlink 141, to data storage device(s) 160. Data storage subsystem 139 provides applications, program code, and stored data on nonvolatile storage that is accessible by controller 140. For example, data storage subsystem 139 can provide a selection of applications and computer data, such as communication application 150 that includes DNCR module 152 and other application(s) 154. These applications can be loaded into device memory 142 for execution by controller 140. In one or more embodiments, data storage device(s) 250 can include hard disk drives (HDDs), optical disk drives, and/or solid-state drives (SSDs), etc. Data storage subsystem 139 of communication device 208 can include removable storage device(s) (RSD(s)) 252, which is received in RSD interface 254. Controller 140 is communicatively connected to RSD 252, via system interlink 141 and RSD interface 254. In one or more embodiments, RSD 164 is a non-transitory computer program product or computer readable storage device. Controller 140 can access RSD 164 or data storage device(s) 160 to provision communication device 208 with program code, such as code for communication application 150 and other application(s) 154, and with computer data 162 such as visual object library 164 (FIG. 1).

Communication device 208 further includes communication subsystem 116 for communicating, using a cellular connection, with network node(s) 260 of external communication system 211 and for communicating, using a wireless connection, with vehicle access point 112 of local communication system 209. Communication subsystem 116 includes antenna subsystem 262. Communication subsystem 116 includes radio frequency (RF) front end 263 and communication module 264. RF front end 263 includes transceiver(s) 266, which includes transmitter(s) 268 and receiver(s) 270. RF front end 263 further includes modem(s) 272. Communication module 264 of communication subsystem 116 includes baseband processor 274 that communicates with controller 140 and RF front end 263. Baseband processor 274 operates in a baseband frequency range to encode data for transmission and decode received data, according to a communication protocol. Modem(s) 272 modulate baseband encoded data from communication module 264 onto a carrier signal to provide a transmit signal that is amplified by transmitter(s) 268. Modem(s) 272 demodulates each signal received from external communication system 211 using by antenna subsystem 262. The received signal is amplified and filtered by receiver(s) 270, which demodulate received encoded data from a received carrier signal.

In one or more embodiments, controller 140, via communication subsystem 116, performs multiple types of cellular OTA or wireless communication with local communication system 209. Communication subsystem 116 can communicate via an over-the-air (OTA) connection 276 with local wireless devices 278. In an example, OTA connection 276 is a peer-to-peer connection, Bluetooth connection, or other personal access network (PAN) connection. In one or more embodiments, communication subsystem 116 communicates with one or more locally networked devices via a wireless local area network (WLAN) link 279 supported by vehicle access point 112. In one or more embodiments, vehicle access point 112 supports communication using one or more IEEE 802.11 WLAN protocols. Vehicle access point 112 is connected to external networks 145 via a cellular connection. In one or more embodiments, communication subsystem 116 communicates with GPS satellites 280 via downlink channel 282 to obtain geospatial location information. Communication subsystem 116 can communicate via an over-the-air (OTA) cellular connection 284 with network node(s) 260.

According to aspects of the present disclosure, mobile electronic system 101 includes at least one image capturing device 132 positionable to have a field of view encompassing at least a face and/or posture of driver 102 of vehicle 103. At least one sensor 120 (FIG. 1) of mobile electronic system 101 detects external conditions to vehicle 103 that can require driver 102 to be more attentive while vehicle 103 is in motion. Mobile electronic system 101 includes communication subsystem 116 that is connectable to a communication network 147 (FIG. 1). At least one output device 146 (FIG. 1) of mobile electronic system 101 provides a communication output from a network-connected communication session with at least one second electronic device 109a-109m (FIG. 1).

Memory subsystem 138 (FIG. 1) of mobile electronic system 101 stores communication application 150 including DNCR module 152. Controller 140 of mobile electronic system 101 is communicatively connected to communication subsystem 116, at least one sensor 120, at least one image capturing device 132, memory subsystem 138, and at least one output device 146. Controller 140 executes communication application 150 to connect, via communication subsystem 116 and communication network 147, with at least one second electronic device 109a-109m (FIG. 1) during the communication session. Controller 140 receives an indication of a challenging driving condition from at least one of a first image stream from at least one image capturing device 132 and a detected condition from at least one sensor 120. In response to receiving the indication of the challenging driving condition, controller 140 communicates, via communication subsystem 116 and communication network 147, a notification over the communication session to at least one second electronic device 109a-109m (FIG. 1), the notification indicating that driver 102 is in the challenging driving condition.

In one or more embodiments, controller 140 receives the first image stream from first image capturing device 132. Controller 140 analyzes one or more of an expression of the face of driver 102 and a posture of driver 102 contained in the first image stream. Controller 140 determines that the challenging driving condition exists in response to identifying a corresponding one or more of a stressed expression and a stressed posture.

In one or more embodiments, prior to determining the challenging driving condition, controller 140 communicates the first image stream to the communication session. Then controller 140 replaces at least a portion of the first image stream with the notification in response to determining the challenging driving conditions exist.

In one or more embodiments, controller 140 determines that the challenging driving condition exists by identifying one or more of hazardous road conditions, proximity of at least one pedestrian, and proximity of another vehicle, at least in part based on the sensed condition from the at least one sensor. In one or more particular embodiments, controller 140 identifies a look gaze direction of eyes of the face of the driver. Controller 140 presents a local notification to at least one output device 146 in response to determining that the look gaze direction indicates that driver 102 is not looking out at a roadway and surrounding driving conditions and that the challenging driving condition exists. The local notification prompts driver 102 to pay attention to the challenging driving conditions.

In one or more embodiments, at least one sensor 120 includes a second image capturing device (110, 130) that captures a second image stream of conditions external to vehicle 103. Controller 140 receives the second image stream from the second image capturing device (110, 130). Controller 140 identifies the external conditions contained in the second image stream as representative of at least one challenging driving condition. Controller 140 communicates the notification in response to the second image stream including images representative of at least one challenging driving condition, to visually indicate to a user (106) of second electronic device 109a-109m that driver 102 is in the challenging driving condition.

In one or more embodiments, controller 140 determines that the challenging driving conditions exist based on: (i) receiving information from one or more of navigation service 176 and weather service 178 (FIG. 1) that vehicle 103 is driving in an area subject to a corresponding one of hazardous traffic conditions and hazardous road conditions;

and (ii) analyzing the first image stream to verify the one of hazardous traffic conditions or hazardous road conditions.

In one or more embodiments, mobile electronic system 101 includes microphone 242 communicatively coupled to controller 140 and positioned to detect sounds spoken by driver 102. Controller 140 compares current speech detected by microphone 242 to baseline speech characterized as unstressed. Controller 140 identifies that driver 102 is experiencing challenging driving conditions at least in part based on a change, by more than a baseline threshold amount, in a sound characterization of the current speech, which indicates stressed speech.

In one or more embodiments, mobile electronic system 101 is, or consists essentially of, a mobile user device such as communication device 208. At least one output device 146 (FIG. 1) includes a display device such as touch display 240. At least one sensor 120 (FIG. 1) is one of (a) embedded within a housing of the mobile user device and (b) communicatively connected to a local communication interface of the mobile user device.

In one or more embodiments, while disconnected from a communication session, controller 140 receives an indication of a challenging driving condition from at least one of the first image stream from at least one image capturing device 132 and a detected condition from the at least one sensor (110, 130). Controller 140 stores a status of the driving conditions for the vehicle corresponding to mobile electronic system 101 as a challenging driving condition in memory subsystem 138. In one or more embodiments, memory subsystem is accessible to communication application 150 at one or more of device memory 142 at mobile electronic system 101 and network memory 114 (FIG. 1) at communication network 145. In response to detecting a request to initiate a new communication session, controller 140 transmits the status to requesting second electronic device(s) 109a-109m without connecting to the new communication session. In one embodiment, the status can be tracked via a driving condition entry stored in a particular memory location/address, the entry being one or more bits settable by the controller to at least two different values, a first default value (e.g., 0/00) indicating that no challenging condition currently exist and a second value (e.g., 1/01) indicating when a challenging driving condition is detected. It is appreciated that other embodiments may provide for different levels of challenging driving conditions being uniquely identified using a larger number of bits enabling additional distinct values (e.g., 00, 01, 10, 11, with 2 bits). Controller periodically detects/identifies the current driving conditions and updates the value of the bit accordingly.

FIG. 3 depicts communication environment 300 of stationary electronic system 105 that includes network electronic device 107 such as a network server that is configured to facilitate communication between first electronic device 108 used by driver 102 and second electronic device 109 used by second participant 106 and to perform driver distraction notification and resulting communication reduction functions. Network electronic device 107 includes memory subsystem 138, communication subsystem 116, which includes one or more network interfaces 117 connected to external networks 145 via fiber 305, and data storage subsystem 116 managed by controller 140 via system interlink 141. Network electronic device 107 may have identical or similar components and functionality as described above for electronic device 108 of FIG. 1 and communication device 208 of FIG. 2. Controller 140 executes applications stored in memory subsystem 138 to support communication. In an example, enterprise communication management application 320 can host an audio and/or video communication session as well as communicate data associated with the session between user devices. Enterprise communication management application 320 creates and manages communication subscriber database 322 that is also stored in memory subsystem 138. Controller 140 also executes applications stored in memory subsystem 138 to support aspects of the present disclosure. Enterprise driver distraction notification and communication reduction (EDNCR) application 330 detects and responds to instances of challenging driving conditions for one or more participants in a communication session. EDNCR application 330 creates and maintains driving status reports 332 from a plurality of electronic devices to prompt notifications and reductions in communication content pushed to particular user devices described below for FIG. 6.

According to aspects of the present disclosure, stationary electronic system 105 includes communication subsystem 116 connectable to communication network 145 (FIG. 1) and controller 140 communicatively connected to communication subsystem 116. With stationary electronic system 105 operating as a host for communication sessions, controller 140 initiates setup of a communication session, via communication subsystem 116 and communication network 145 (FIG. 1), with at least one first electronic device 108 and one second electronic device 109. In response to determining that first electronic device 108 is being used by driver 102 in vehicle 103 that is potentially in a challenging driving condition, controller 140 pauses or halts setup of the communication session to reduce distractions to driver 102 while the vehicle is in the challenging driving condition. Controller 140 requests data about/from first electronic device 108 that indicates whether current driving conditions allow driver 102 to communicate without degrading driving performance. Controller 140 completes setup of the communication session in response to verifying that driver 102 is able to communicate while safely operating the vehicle under the current driving conditions.

In one or more embodiments, in response to initiating the setup of the communication session, controller 140 receives, from communication network 145 (FIG. 1), information indicating that first electronic device 108 is being used by user or driver 102 who is driving based on one or more of: (i) a rate of movement of first electronic device 108; (ii) geographic location of first electronic device 108 indicating movement aligned with a roadway; and (iii) a report from navigation application 236 (FIG. 2) being executed by first electronic device 108 (FIG. 1).

In one or more embodiments, to verify that driver 102 is able to communicate while safely operating vehicle 103 under the current driving conditions, controller 140 identifies a geographic location of first electronic device 108 and queries one or more of navigation service 176 and weather service 178 (FIG. 1) for information of a corresponding one of hazardous traffic conditions and hazardous road conditions at the location.

In one or more embodiments, to verify that driver 102 is able to communicate while safely operating vehicle 103 under the current driving conditions, controller 140 transmits a request, to first electronic device 108, for a user input that indicates whether driver 102 is able to communicate while safely operating vehicle 103 under the current driving conditions. Controller 140 completes setup of the communication session in response to receiving, from driver 102 via first electronic device 108, an affirmative response to the request for the user input.

In one or more embodiments, to verify that driver 102 is able to communicate while safely operating vehicle 103 under the current driving conditions, controller 140 transmits a request, to first electronic device 108, for a user input that indicates whether driver 102 is able to communicate while safely operating vehicle 103 under the current driving conditions. Controller 140 discontinues setup of the communication session and activates a timer with a time period for a delayed setup of a communication session in response to receiving, from the driver via the first electronic device, a negative response to the request for the user input.

In one or more embodiments, to verify that driver 102 is able to communicate while safely operating vehicle 103 under the current driving conditions, controller 140 transmits a request, to the driver via the first electronic device, for a user input that indicates whether the driver is able to communicate while safely operating the vehicle under the current driving conditions. Controller 140 completes setup of the communication session and pauses communication of content to the first electronic device in response to receiving a negative user input from the driver using the first electronic device. In one or more particular embodiments, controller 140 initiates communicating content to the first electronic device in response to subsequently receiving an affirmative user input from the driver using the first electronic device.

In one or more embodiments, stationary electronic system 105 includes at least one output device 146 (FIG. 1) at the at least one second electronic device 109 that is communicatively coupled to controller 140. The at least one output device 146 (FIG. 1) presents one or more of an audio output and a visual output. Controller 140 presents a notification via at least one output device 146 (FIG. 1) indicating that first electronic device 108 is being used by driver 102 in vehicle 103.

In one or more embodiments, to verify that driver 102 is able to communicate while safely operating vehicle 103 under the current driving conditions, controller 140 transmits a request, to a navigation application that is either executed by first electronic device 108 or communicating with first electronic device 108, for data that indicates whether driver 102 is able to communicate while safely operating vehicle 103 under the current driving conditions. Controller 140 completes setup of the communication session in response to receiving, from navigation application 236 (FIG. 2), an affirmative response to the request for the user input. Controller 140 discontinues setup of the communication session and activates timer 237 (FIG. 2) with a time period for a delayed setup of a communication session in response to receiving, from navigation application 236 (FIG. 2), a negative response to the request for the user input.

According to one or more aspects of the present disclosure, stationary electronic system 105 includes communication subsystem 116 connectable to communication network 147 (FIG. 1) and controller 140 communicatively connected to communication subsystem 116. With stationary electronic system 105 operating as a host for communication sessions, controller 140 communicates, via communication subsystem 116 and communication network 147 (FIG. 1), with at least one first electronic device 108 participating in a communication session with at least one second electronic device 109. In response to determining that first electronic device 108 is being used by driver 102 in vehicle 103 that is potentially in a challenging driving condition, controller 140 receives data from/about either directly or indirectly from first electronic device 108 that indicates whether current driving conditions allow driver 102 to communicate without degrading driving performance. When the received data indicates driver 102 is in the challenging driving condition, controller 140 restricts transmission of new communication inputs from the communication session to first electronic device 108 to reduce distractions to driver 102.

In one or more embodiments, controller 140 receives, from first electronic device 108, a first image stream that captures at least one of a face of driver 102 or a forward view of surrounding conditions of vehicle 103. Controller 140 analyzes the first image stream to determine whether first electronic device 108 is being used by a driver in a vehicle that is moving and whether driver 102 is potentially in a challenging driving condition. Controller 140 restricts the communication session to reduce distractions to driver 102 in response to determining that first electronic device 108 is being used by driver 102 in moving vehicle 103 and that driver 102 is potentially in the challenging driving condition.

In one or more embodiments, controller 140 receives, from first electronic device 108, a first image stream that captures at least a face of driver 102. Controller 140 analyzes the first image stream for one or more of a stressed expression or tense posture of driver 102. Controller 140 determines whether the current driving condition allow driver 102 to communicate without degrading driving performance based on whether the stressed expression or tense posture is identified. Controller 140 restores full functionality of the communication session in response to verifying that driver 102 is able to communicate without restrictions under the current driving conditions.

In one or more embodiments, to determine whether driver 102 is able to communicate in the current driving condition without degrading driving performance, controller 140 receives information identifying a geographic location and direction of movement of first electronic device 108. Controller 140 queries one or more of navigation service 176 and weather service 178 for information of a corresponding one of hazardous traffic conditions and hazardous road conditions at the location.

In one or more embodiments, to determine whether the current driving condition allows driver 102 to communicate without degrading driving performance, controller 140 transmits a request, to first electronic device 108, for a user input/response that indicates whether current driving conditions allow driver 102 to communicate without degrading driving performance. Controller 140 pauses the communication session in response to receiving, from driver 102 via first electronic device 108, a negative user response to the request for the user input. Controller 140 restores the communication session in response to receiving, from driver 102 via first electronic device 108, an affirmative user response to the request for the user input.

In one or more embodiments, to determine whether the current driving conditions allow driver 102 to communicate without degrading driving performance, controller 140 transmits a request, to first electronic device 108, for a user input that indicates whether current driving conditions allow driver 102 to communicate without degrading driving performance. Controller 140 disconnects first electronic device 108 from the communication session in response to receiving, from driver 102 via first electronic device 108, a negative user response to the request for the user input. Controller 140 activates timer 237 with a time period for rechecking the driving conditions prior to reconnecting first electronic device 108 to the communication session.

In one or more embodiments, stationary electronic system 105 includes at least one output device 146 (FIG. 1) that presents one or more of an audio output and a visual output and that is communicatively coupled to controller 140. Controller 140 presents a prompt at the at least one output device 146 (FIG. 1) indicating that first electronic device 108 is being used by driver 102 in vehicle 103. In one or more particular embodiments, controller 140 communicates the prompt, via communication subsystem 116 and communication network 147 (FIG. 1), to at least one second electronic device 109*m* of the at least one second electronic devices 109.

In one or more embodiments, controller 140 receives an audio stream from first electronic device 108. Controller 140 compares current speech detected in the audio stream to baseline speech characterized as unstressed speech. Controller 140 restricts the communication session to reduce distractions to driver 102 at least in part based on a change in a sound characterization of the current speech by more than a baseline threshold amount indicating stressed speech, while driver 102 is potentially in a challenging driving condition.

Figure 4:
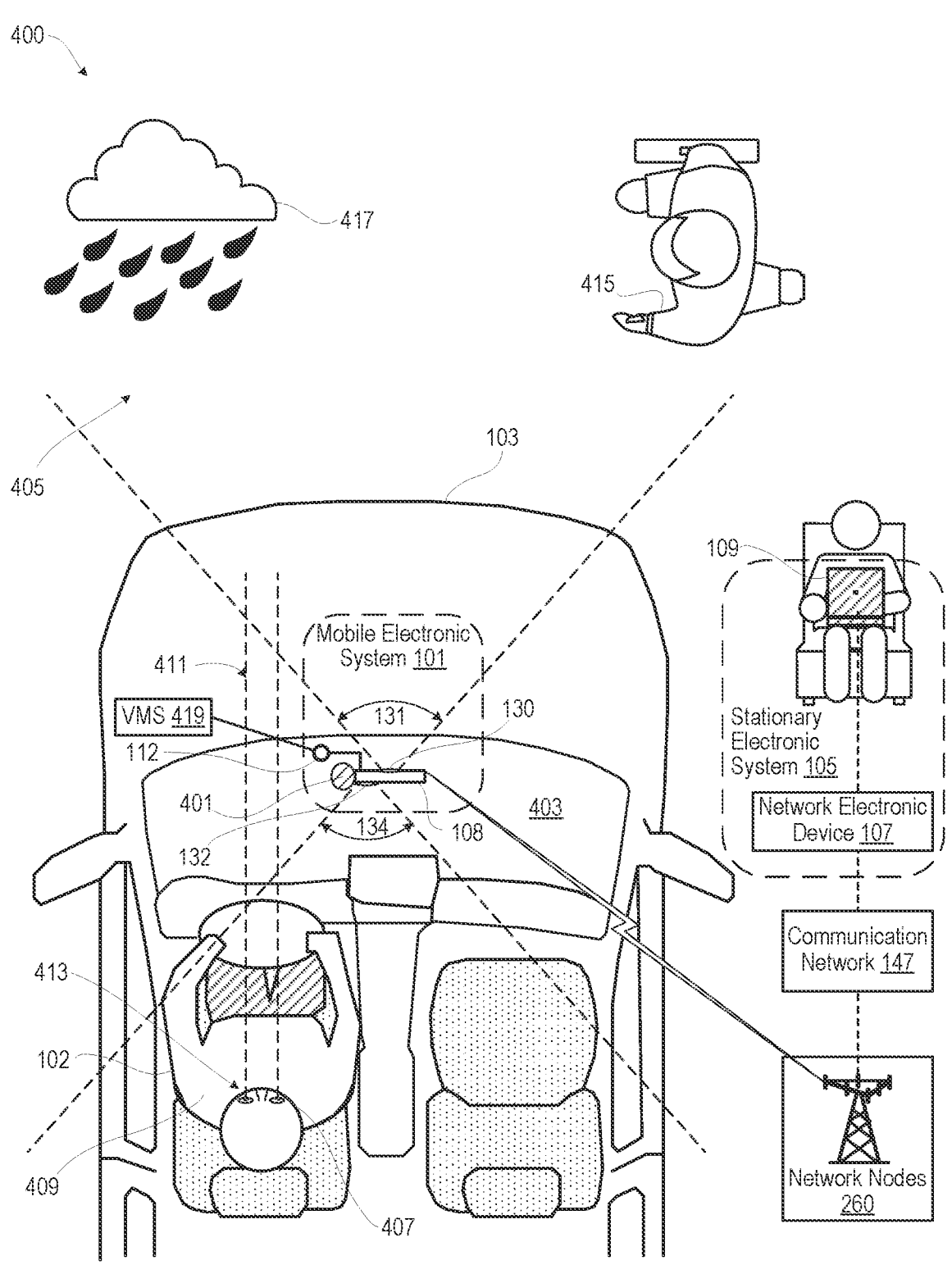
FIG. 4 depicts an example layout diagram of the communication environment with the mobile electronic system positioned in a vehicle that is in a challenging driving condition, which is being mitigated by driver distraction notification and communication reduction features, according to one or more embodiments.

FIG. 4 depicts an example layout diagram of communication environment 400 with mobile electronic system 101 positioned in vehicle 103 that is in a challenging driving condition, which is mitigated by driver distraction notification and communication reduction features, according to one or more embodiments. Mobile electronic system 101 consists essentially of first electronic device 108 that is positioned by fixture 401 on dash 403 of vehicle 103. Fixture 401 positions FOV 131 of back ICD 130 to view driving conditions 405 and positions FOV 134 of front ICD 132 to view face 407 and posture 409 of driver 102. First electronic device 108 is positioned on dashboard of vehicle 103 to provide easy viewing by driver 102 without blocking the view forward. Look gaze direction 411 of eyes 413 of driver 102 are looking straight ahead and not at first electronic device 108. First electronic device 108 is communicating with stationary electronic system 105 of network electronic devices 107 and second electronic devices 109 via network nodes 260 and communication network 147.

Figure 5A:
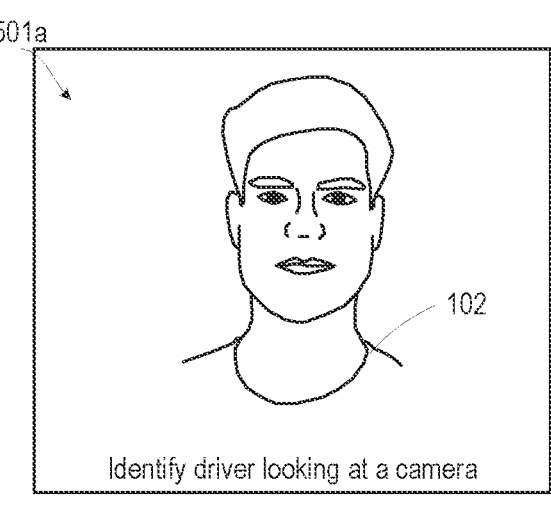
FIG. 5A depicts a first image of a driver looking at a camera, according to one or more embodiments.
Figure 5B:
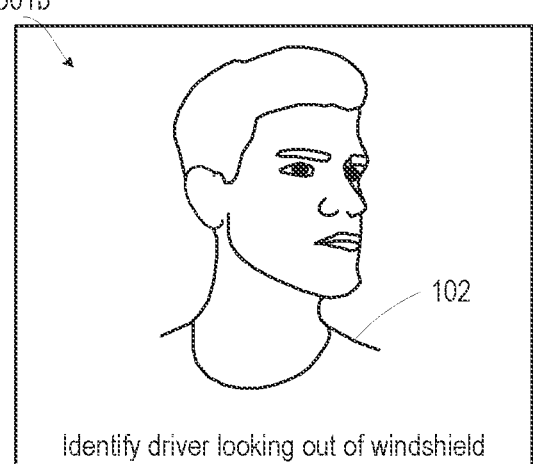
FIG. 5B depicts a second image of the driver looking away from the camera and towards a roadway on which the vehicle is traveling, according to one or more embodiments.
Figure 5C:
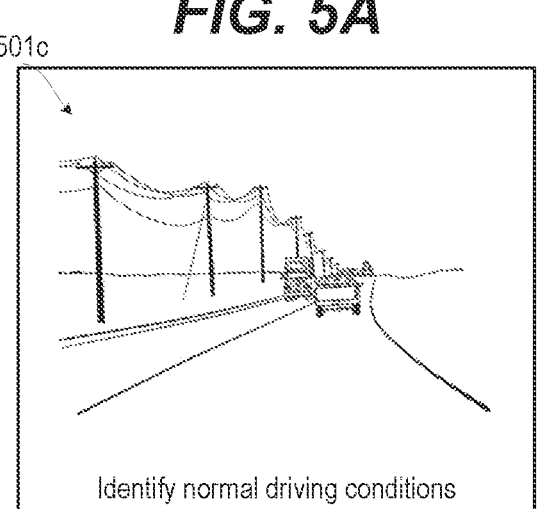
FIG. 5C is a third image depicting example normal driving conditions forward of the vehicle, according to one or more embodiments.
Figure 5D:
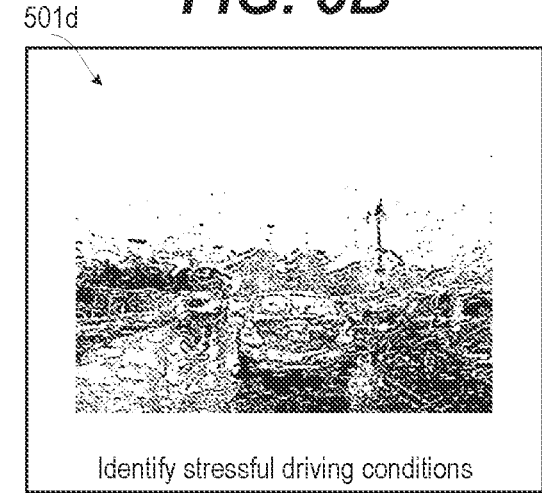
FIG. 5D is a fourth image depicting example challenging driving conditions forward of the vehicle, according to one or more embodiments.

First electronic device 108 of mobile electronic system 101 may detect urgent challenging driving conditions of short duration, such as appearance of pedestrian 415 in the path of vehicle 103. In response, first electronic device 108 may immediately trigger cessation of presenting content from the communication session. In one or more embodiments, the first electronic device 108 may determine that the presence of the pedestrian 415 walking or crossing the road and/or presence in school zones, high traffic areas, etc., is a challenging driving condition in response to determining that the look gaze direction 411 of driver 102 is away from pedestrian 415. FIG. 5A is first image 501*a* that depicts driver 102 looking at a camera (132, FIG. 4). FIG. 5B is second image 501*b* depicts driver 102 looking away from the camera (132, FIG. 4) and out towards a front of vehicle 103 (FIG. 4). With continued reference to FIG. 4, first electronic device 108 of mobile electronic system 101 may integrate information from multiple sources to determine challenging driving conditions of longer duration. In an example, first electronic device 108 may visually detect precipitation 417 (e.g., rainfall, snowfall, sleet, haze). FIG. 5C is third image 501*c* that depicts example normal driving conditions in front of vehicle 103 (FIG. 4). FIG. 5D is fourth image 501*d* that depicts example challenging driving conditions in front of vehicle 103 (FIG. 4). With continued reference to FIG. 4, the severity of the precipitation 417 may be verified at least in part based on determining sensed or reported temperatures at a location of vehicle 103. Other sensed or identified severity factors may include vehicle speed, type of road surface, inclines/declines or turns of the road, wind speed and direction, and other factors. First electronic device 108 may be communicatively connected to a vehicle management system (VMS) 419 via wired or wireless connection to vehicle AP 112 to receive data such as detected tire slippage. First electronic device 108 may also detect driving proficiency of driver 102 to adjust thresholds for a challenging driving condition determination.

Figure 5E:
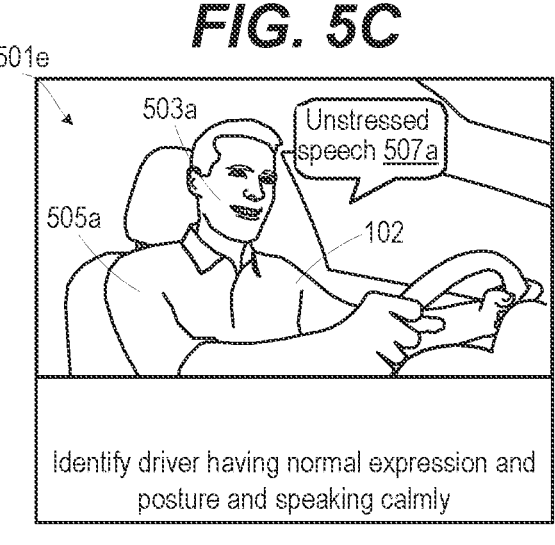
FIG. 5E is a fifth image depicting the driver having a facial expression and posture that is relaxed and unstressed, according to one or more embodiments.
Figure 5F:
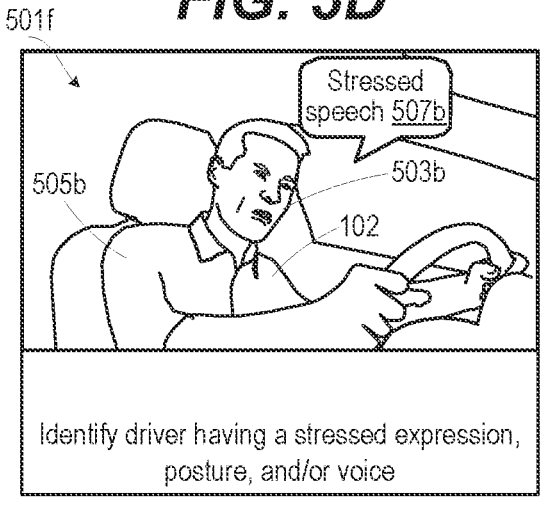
FIG. 5F is a sixth image depicting the driver having a facial expression and posture that is tense and stressed, according to one or more embodiments.

In one or more embodiments, first electronic device 108 detects visual and/or audible responses by driver 102 to the driving conditions to determine whether the driver 102 is being challenged. FIG. 5E is fifth image 501e that depicts driver 102 having facial expression 503a and posture 505a that is relaxed and unstressed. Driver 102 is also producing unstressed speech 507a. FIG. 5F is sixth image 501f that depicts driver 102 having facial expression 503b and posture 505b that is tense and stressed. Driver 102 is also producing stressed speech 507b.

Figure 6:
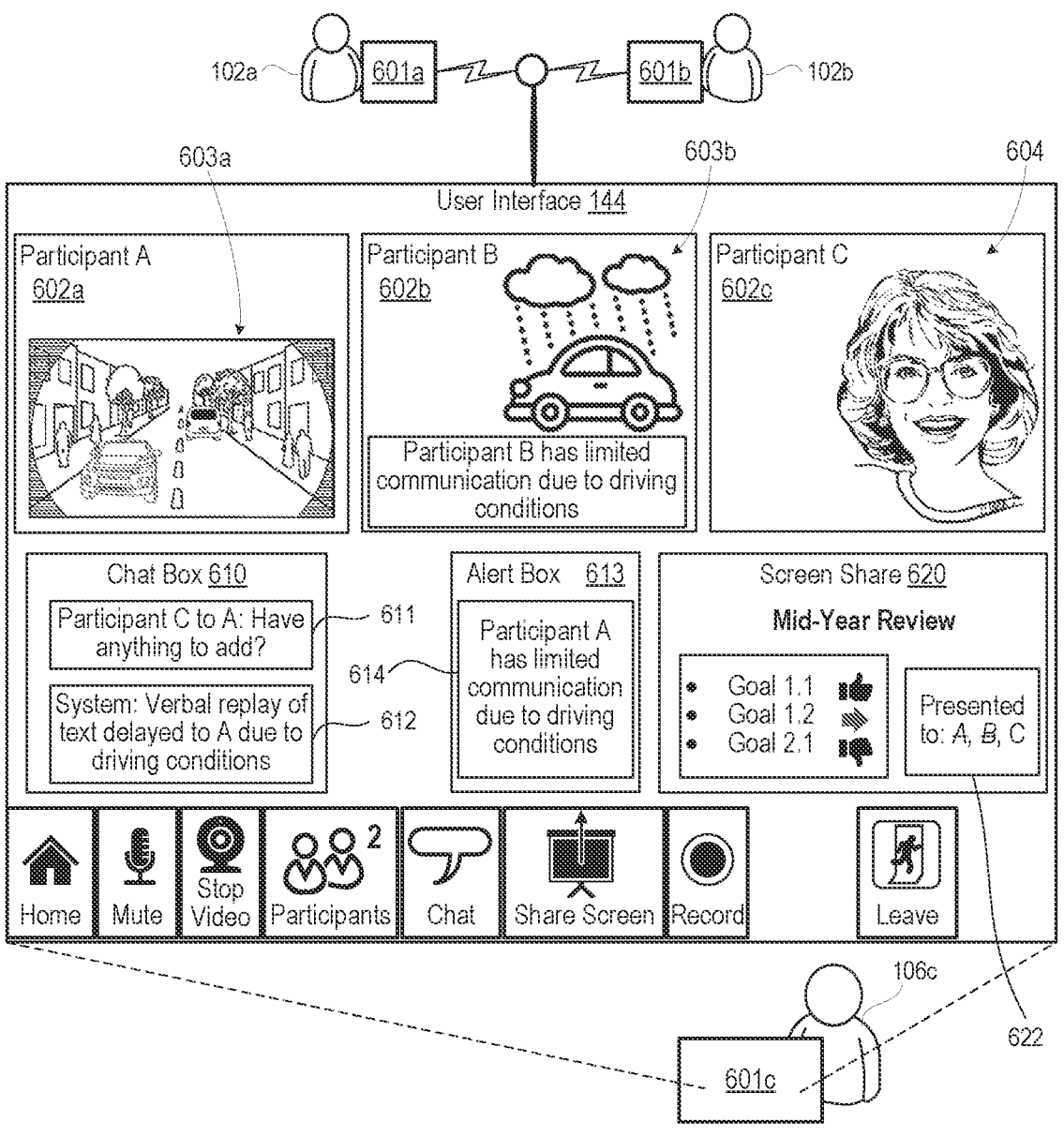
FIG. 6 depicts an example user interface for a communication session including mitigating features for driver distraction notification and communication reduction, according to one or more embodiments.

FIG. 6 depicts example user interface device 144 for a communication session between participant A (driver 102a) using first device 601a, second participant B (driver 102b) using second device 601b, and local participant C 106c using third device 601c. User interface device 144 presents mitigating features for driver distraction notification to participant C 106c to prompt communication reduction for drivers 102a-102b. In an example, each participant has respective avatar or video stream window 602a, 602b, and 602c. Both first and second drivers 102a-102b are identified as being in a challenging driving condition. To notify local participant C 106c, user interface device 144 may present a dashcam view 603a in window 602a that is streamed from first electronic device 601a, enabling local participant C 106c to receive the visual experience as a passenger in the vehicle with driver 102a, thus experiencing the severity of the challenging driving conditions intuitively and in real-time. To notify local participant C 106c, user interface device 144 may present a notification image 603b in window 602b to inform local participant C 106c of the challenging driving conditions. Due to communication limitations or privacy considerations, second device 601b may not stream an image stream of a forward view that depicts the challenging driving conditions to the communication session. Alternatively, the forward view may not enable participant C 106c to readily discern the challenging driving condition from the forward view and thus the forward view may not be selected for notification. Avatar, still image, or image stream 604 of local participant C 106c is shared to the communication session and lacks a notification or indication of being in a challenging driving condition. In one or more embodiments, in addition to visually notifying other participants that particular participants are encountering challenging driving conditions, user interface device 144 may present auditory notifications to participant C 106c. In an example, user interface device 144 may revert to auditory notifications if participant C 106c is not receiving or viewing visual content of the communication session. In one or more embodiments, the user interface device 144 that local to the drivers 102a-102b may present audio inputs from remote participants, such as participant C 106c, are automatically muted or attenuated in volume to reduce distractions.

Other information shared during the communication session may include notifications of the status of drivers 102a-102b who are in challenging driving conditions. In an example, chat box 610 can include messages 611 from participants as well as automated notification messages 612.

A visual alert box 613 may pop-up, visually presenting notification 614 to non-driving participant C 106c, which may be accompanied by a verbal notification as appropriate for the type of communication session. Screen share window 620 may be accompanied by a notification 622 of which participants are prevented from viewing the content due to being in a challenging driving condition.

Figure 7A:
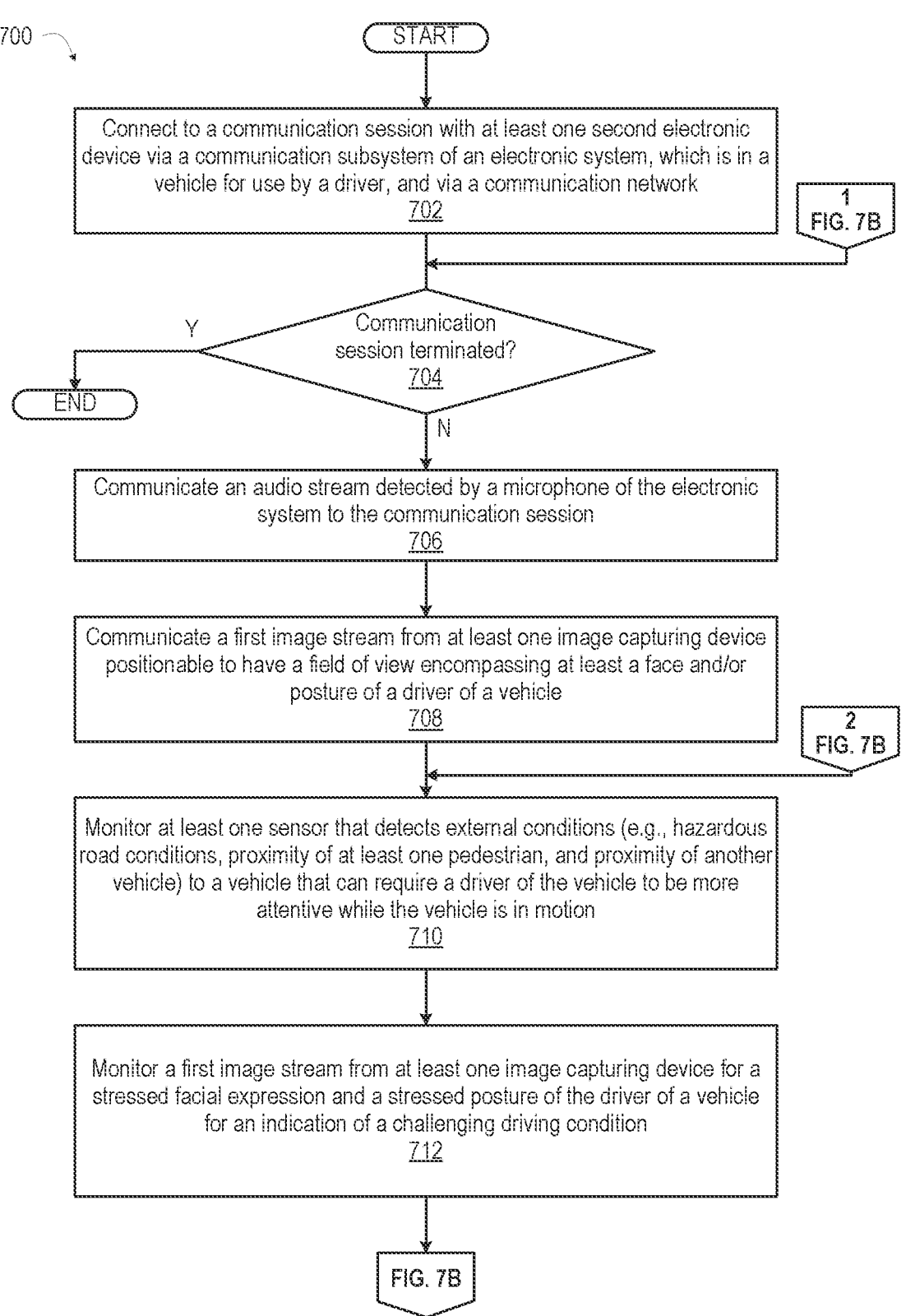
FIGS. 7A-7B (collectively "FIG. 7") present a flow diagram of a method of reducing, by a mobile electronic system, distractions to a driver of a vehicle experiencing challenging driving conditions during a communication session, according to one or more embodiments.
Figure 7B:
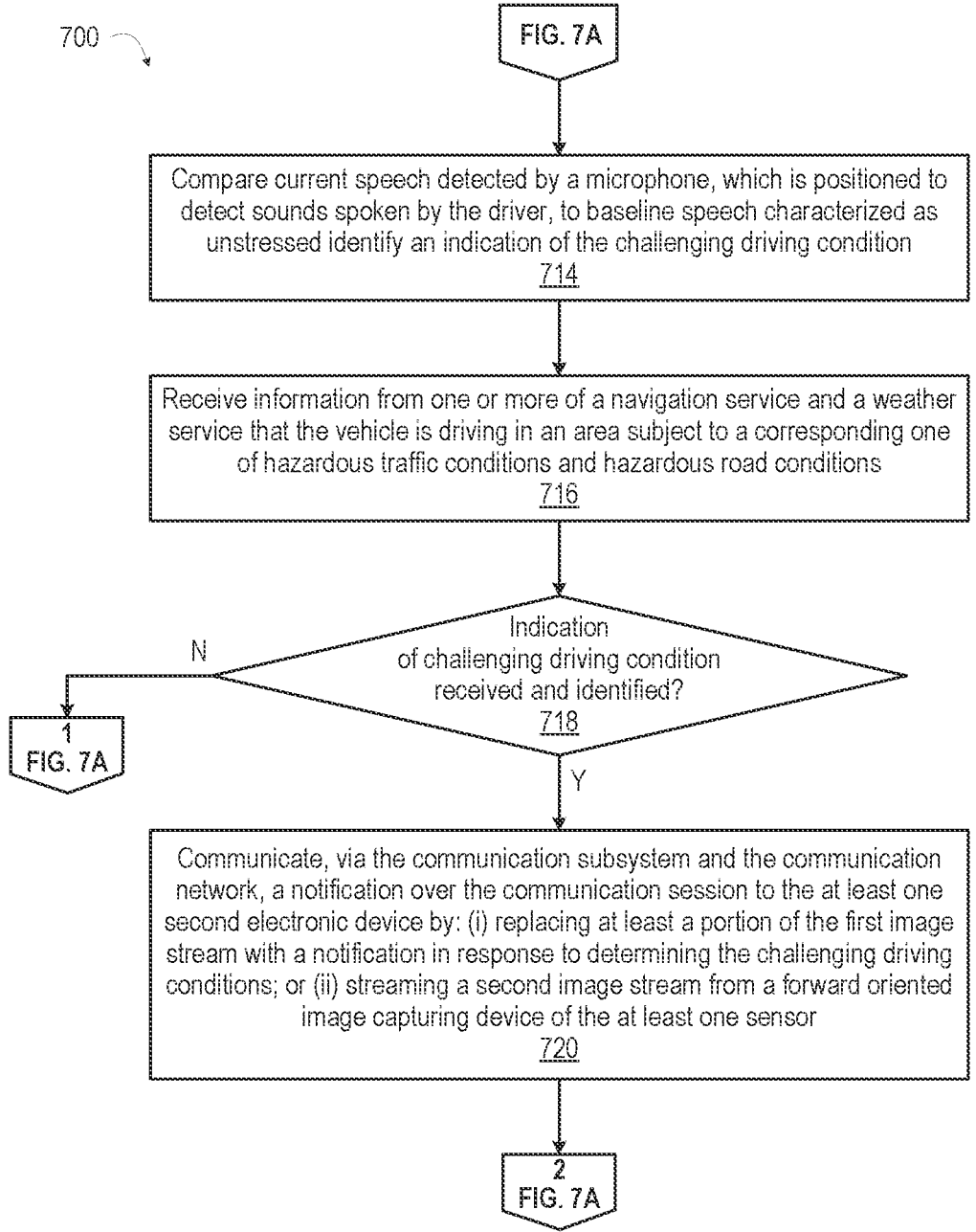

FIGS. 7A-7B (collectively "FIG. 7") present a flow diagram of a method for reducing driver distractions by a mobile electronic system to a driver of a vehicle experiencing challenging driving conditions while engaged in a communication session. FIG. 8 presents a flow diagram of a method of selectively setting up and connecting a communication session with a remote mobile electronic system used by a driver to enable reduction in distractions based on challenging driving conditions. FIG. 9 presents a flow diagram of a method of reducing driver distractions during a communication session with a remote mobile electronic system used by a driver in challenging driving conditions. The descriptions of method 700 (FIGS. 7A-7B), method 800 (FIG. 8), and method 900 (FIG. 9) are provided with general reference to the specific components illustrated within the preceding FIGS. 1-4 and 5A-5F. Specific components referenced in method 700 (FIGS. 7A-7B), method 800 (FIG. 8), and method 900 (FIG. 9) may be identical or similar to components of the same name used in describing preceding FIGS. 1-4 and 5A-5F. In one or more embodiments, controller 140 (FIGS. 1-3) respectively of mobile electronic system 101 (FIG. 1), communication device 208 (FIG. 2) and stationary electronic system 105 (FIG. 3) provides functionality of method 700 (FIGS. 7A-7B), method 800 (FIG. 8) and method 900 (FIG. 9).

With reference to FIG. 7A, method 700 includes connecting, via a communication subsystem of an electronic system, to a communication session with at least one second electronic device, the electronic system being in a vehicle operated by a driver (block 702). Method 700 includes determining whether the communication session is locally or remotely terminated (decision block 704). In response to determining that the communication session is terminated, method 700 ends. In response to determining that the communication session is not terminated, in one or more embodiments, method 700 includes communicating an audio stream detected by a microphone of the electronic system to the communication session (block 706). In one or more embodiments, method 700 includes communicating to the communication session a first image stream from at least one image capturing device positionable to have a field of view encompassing at least a face and/or posture of a driver of a vehicle (block 708). Method 700 includes monitoring at least one sensor that detects external conditions (e.g., hazardous road conditions, proximity of at least one pedestrian, and proximity of another vehicle) to a vehicle, where the external conditions can require a driver of the vehicle to be more attentive while the vehicle is in motion (block 710). Method 700 includes monitoring a first image stream from at least one image capturing device for a stressed facial expression and/or a stressed posture of the driver of the vehicle, which correlates to or is an indication of a challenging driving condition (block 712). Then method 700 proceeds to block 714 of FIG. 7B.

With reference to FIG. 7B, in one or more embodiments, method 700 includes comparing current speech detected by a microphone, which is positioned to detect sounds spoken by the driver, to baseline speech characterized as unstressed in order to identify an indication of the challenging driving condition (block 714). In one or more embodiments, method 700 includes receiving information from one or more of a navigation service and a weather service that the vehicle is driving in an area subject to a corresponding one of hazardous traffic conditions and hazardous road conditions that verify or corroborate inconclusive visual indications (block 716). Method 700 include determining whether the indication of the challenging driving condition is received and identified (decision block 718). In response to determining that no challenging driving condition is received or identified, method 700 returns to block 704 (FIG. 7A). In response to determining that the challenging driving condition is received and identified, method 700 may include communicating, via the communication subsystem and the communication network, a notification over the communication session to the at least one second electronic device by: (i) replacing at least a portion of the first image stream with the notification in response to determining the challenging driving conditions exists; or (ii) streaming a second image stream from a roadway facing/oriented image capturing device, utilized as one of the at least one sensor (block 720). Then method 700 returns to block 710 (FIG. 7A).

In one or more embodiments, method 700 includes identifying a look gaze direction of eyes of the face of the driver. Method 700 includes presenting a local notification at the at least one output device in response to determining that the look gaze direction indicates that the driver is not looking out at a roadway and surrounding driving conditions and that the challenging driving condition exists. The local notification prompts the driver to pay attention to the challenging driving conditions.

In one or more embodiments, method 700 includes, while disconnected from a communication session, receiving an indication of a challenging driving condition from at least one of the first image stream from the at least one image capturing device and a detected condition from the at least one sensor. Method 700 includes storing, in memory accessible to the communication application at one or more of the memory at the electronic system and the communication network, a driving condition status of the electronic system as being in a challenging driving condition. Method 700 includes transmitting the status to a requesting second electronic device without connecting a new communication session.

With reference to FIG. 8, method 800 includes initiating setup of a communication session by the electronic system as host, with a first electronic device and at least one second electronic device (block 802). Method 800 includes determining that the first electronic device is being used by a driver in a vehicle by receiving, from the communication network, information indicating that the first electronic device is being used by a user who is driving, based on one or more of: (i) a rate of movement of the first electronic device; (ii) geographic location of the first electronic device indicating movement aligned with a roadway; and (iii) a report from a navigation application being executed by the first electronic device (block 804). Method 800 includes pausing setup of the communication session to reduce possible distractions to the driver when communicating while potentially in a challenging driving condition (block 806). Method 800 includes requesting data about/from the first electronic device that indicates whether current driving conditions allow the driver to communicate without degrading driving performance by one of: (i) identifying a geographic location of the first electronic device and querying one or more of a navigation service and weather service for information of a corresponding one of hazardous traffic conditions and hazardous road conditions at the location;

and (ii) transmitting a request, to the first electronic device, for a user input or an automated response from a navigation application that indicates whether the driver is able to communicate while safely operating the vehicle under the current driving conditions (block 808). Method 800 includes determining whether an indication is received indicating it is safe for the driver to communicate via a communication session (decision block 810). In response to determining that the indication of safe to communicate is received, method 800 includes completing setup of the communication session (block 812). Then method 800 ends. In response to determining that the indication of safe to communicate is not received, method 800 includes discontinuing setup of the communication session to reduce distractions to the driver by (block 814). In one embodiment, method 800 also includes optionally activating a timer with a time period for a delayed setup of a communication session. Then method 800 ends.

In one or more embodiments, determining that the first electronic device is being used by the driver in the vehicle includes: in response to initiating the setup of the communication, receiving, from the communication network, information indicating that the first electronic device is being used by a user who is driving based on one or more of: (i) a rate of movement of the first electronic device; (ii) geographic location of the first electronic device indicating movement aligned with a roadway; and (iii) a report from a navigation application being executed by the first electronic device.

In one or more embodiments, verifying that the driver is able to communicate while safely operating the vehicle under the current driving conditions includes: (i) identifying a geographic location of the first electronic device; and (ii) querying one or more of a navigation service and weather service for information of a corresponding one of hazardous traffic conditions and hazardous road conditions at the location.

In one or more embodiments, verifying that the driver is able to communicate while safely operating the vehicle under the current driving conditions includes: (i) transmitting a request, to the first electronic device, for a user input that indicates whether the driver is able to communicate while safely operating the vehicle under the current driving conditions; and (ii) receiving, from the driver via the first electronic device, an affirmative response to the request for the user input. Method 800 then includes completing setup of the communication session in response to receiving the affirmative user input from the driver.

In one or more embodiments, in verifying whether the driver is able to communicate while safely operating the vehicle under the current driving conditions, the method includes: (i) transmitting a request, to the first electronic device, for a user input that indicates whether the driver is able to communicate while safely operating the vehicle under the current driving conditions; and (ii) discontinuing setup of the communication session and activates a timer with a time period for a delayed setup of a communication session in response to receiving, from the driver via the first electronic device, a negative response to the request for the user input.

In one or more embodiments, verifying that the driver is able to communicate while safely operating the vehicle under the current driving conditions includes: (i) transmitting a request, to the driver via the first electronic device, for a user input that indicates whether the driver is able to communicate while safely operating the vehicle under the current driving conditions; and (ii) completing setup of the communication session and pausing communication of content to the first electronic device in response to receiving a negative user input from the driver using the first electronic device. In one or more particular embodiments, later initiating communication of content to the first electronic device occurs in response to subsequently receiving an affirmative user input from the driver using the first electronic device. In one or more embodiments, method 800 includes presenting a notification of one or more of an audio output and a visual output via at least one output device at the at least one second electronic device indicating that the first electronic device is being used by a driver in a vehicle that is navigating in potentially difficult/hazardous driving conditions.

In one or more embodiments, verifying that the driver is able to communicate while safely operating the vehicle under the current driving conditions includes: (i) transmitting, to a navigation application executed by or communicating with the first electronic device, a request for data that indicates whether the driver is able to communicate while safely operating the vehicle under the current driving conditions; (iii) completing setup of the communication session in response to receiving, from the navigation application, an affirmative response to the request for the user input; and (iii) discontinuing setup of the communication session and activating a timer with a time period for a delayed setup of a communication session in response to receiving, from the navigation application, a negative response to the request for the user input.

With reference to FIG. 9, method 900 includes an electronic system communicating, via a communication subsystem and a communication network, with a first electronic device participating in a communication session with at least one second electronic device, the communication session hosted by the electronic system (block 902). Method 900 includes identifying that the first electronic device is being used by a driver in a vehicle (block 904). Method 900 includes receiving data (e.g., navigation/weather service data, first image stream of the driver that included stressed or unstressed facial condition and/or stressed or unstressed posture, second image stream of road conditions in front of the vehicle, etc.) about the driver, vehicle, external conditions to the vehicle, and first electronic device that indicates whether current driving conditions allow the driver to communicate with the established communication session without degrading driving performance (block 906). Method 900 includes restricting transmission of new communication inputs from the communication session to the first electronic device while determining whether the current driving condition allows the driver to communicate without degrading driving performance (block 908). Method 900 includes transmitting, to the first electronic device, a request for a user input that indicates whether current driving conditions allow the driver to communicate without degrading driving performance (block 910). Method 900 includes determining whether an affirmative user response is received (decision block 912). In response to determining that an affirmative user response is received verifying that the driver is able to communicate without restrictions under the current driving conditions, method 900 includes restoring the communication session (block 914). Then method 900 returns to block 902. In response to determining that an affirmative user response is not received, method 900 includes continuing to reduce distractions for the driver by one of: (i) disconnecting the first electronic device from the communication session and activating a timer with a time period for performing a next check prior to reconnecting the first electronic device to the communication session; or (ii) pausing the communication session until an affirmative user response is received (block 916). Then method 900 ends.

In one or more embodiments, method 900 includes receiving, from the first electronic device, a first image stream that captures at least one of a face of the driver or a forward view of surrounding conditions of the vehicle. Method 900 includes analyzing the first image stream to determine whether the first electronic device is being used by a driver in a vehicle that is moving, and that the driver is potentially in a challenging driving condition. Method 900 includes restricting the communication session to reduce distractions to the driver in response to determining that the first electronic device is being used by the driver in the vehicle that is moving, and that the driver is potentially in the challenging driving condition.

In one or more embodiments, method 900 includes receiving, from the first electronic device, a first image stream that captures at least a face of the driver. Method 900 includes analyzing the first image stream for one or more of a stressed expression or tense posture of the driver. Method 900 includes determining whether the current driving condition allow the driver to communicate without degrading driving performance based on whether the stressed expression or tense posture is identified. Method 900 includes restoring the communication session in response to verifying that the driver is able to communicate without restrictions under the current driving conditions.

In one or more embodiments, determining whether the driver is able to communicate in the current driving condition without degrading driving performance includes: (i) receiving information identifying a geographic location and direction of movement of the first electronic device; and (ii) querying one or more of a navigation service and weather service for information of a corresponding one of hazardous traffic conditions and hazardous road conditions at the location.

In one or more embodiments, determining whether the current driving condition allows the driver to communicate without degrading driving performance includes: (i) transmitting, to the first electronic device, a request for a user input that indicates whether current driving conditions allow the driver to communicate without degrading driving performance; (ii) pausing the communication session in response to receiving, from the driver via the first electronic device, a negative user response to the request for the user input; and (iii) restoring the communication session in response to receiving, from the driver via the first electronic device, an affirmative user response to the request for the user input.

In one or more embodiments, determining whether the current driving conditions allow the driver to communicate without degrading driving performance includes: (i) transmitting, to the first electronic device, a request for a user input that indicates whether current driving conditions allow the driver to communicate without degrading driving performance; (ii) disconnecting the first electronic device from the communication session in response to receiving, from the driver via the first electronic device, a negative user response to the request for the user input; and (iii) activating a timer with a time period for reconnecting the first electronic device to the communication session.

In one or more embodiments, method 900 includes presenting a prompt of one or more of an audio output and a visual output at one or more output devices to indicate that the first electronic device is being used by a driver in a vehicle. In one or more particular embodiments, method 900 includes communicating the prompt, via the communication subsystem and the communication network, to at least one of the at least one second electronic devices.

In one or more embodiments, method 900 includes: (i) receiving an audio stream from the first electronic device; (ii) comparing current speech detected in the audio stream to baseline speech characterized as unstressed; and (iii) restricting the communication session to reduce distractions to the driver at least in part based on a change in a sound characterization of the current speech by more than a baseline threshold amount indicating stressed speech, while the driver is potentially in a challenging driving condition.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic system comprising:

a communication subsystem connectable to a communication network;

a controller communicatively connected to the communication subsystem, and which:

detects initiation of setup of a communication session between a first electronic device and at least one second electronic device, via the communication subsystem and the communication network, with the electronic system as host;

receives data that indicates that the first electronic device is being used by a driver in a moving vehicle;

in response to determining that the first electronic device is being used by a driver in a moving vehicle:

communicates a request for receipt of information identifying whether driving conditions meet one or more criteria of the following criteria: presence of one or more of snow, rain, haze, wind, or sleet, a road containing turns, an incline/decline, road construction and obstacles, the driving conditions being detected by at least one sensor that detects external conditions to the vehicle;

receives the information including data related to a current driving condition provided by at least one of the first electronic device and the at least one sensor that detects the driving conditions with at least one of the one or more criteria;

pauses setup of the communication session to reduce distractions to the driver in response to receipt of the information identifying that the driver is potentially in the driving condition;

requests data about the first electronic device that indicates whether current driving conditions allow the driver to communicate via the communication session without degrading driving performance, wherein, to verify that the driver is able to communicate while operating the vehicle under the current driving conditions, the controller transmits a request, to the first electronic device, for a user input that indicates whether the driver is able to communicate while safely operating the vehicle under the current driving conditions;

completes setup of the communication session only in response to verifying that the driver is able to communicate via the communication session while safely operating the vehicle under the current driving conditions, wherein the controller triggers completion of the setup of the communication session in response to receiving, from the driver via the first electronic device, an affirmative user input in response to the request for the user input; and disconnects the first electronic device from a connected communication session, in response to receiving a negative response to the request for user input and rechecks the driving conditions prior to reconnecting the first electronic device to the communication session.

2. The electronic system of claim 1, wherein, in determining that the first electronic device is being used by the driver in the moving vehicle, the controller:

during the setup of the communication session, receives information from the communication network indicating that the first electronic device is being used by a user who is driving based on one or more of: (i) geographic location of the first electronic device indicating movement aligned with a roadway; and (ii) a report from a navigation application being executed by the first electronic device.

3. The electronic system of claim 1, wherein, to verify that the driver is able to communicate while safely operating the vehicle under the current driving conditions, the controller:

identifies a geographic location of the first electronic device; and queries one or more of a navigation service and weather service for information of a corresponding one of hazardous traffic conditions and hazardous road conditions at the geographic location.

4. The electronic system of claim 1, wherein, the controller:

discontinues setup of the communication session and activates a timer with a time period for a delayed setup of a communication session in response to receiving, from the driver via the first electronic device, a negative user input in response to the request for the user input.

5. The electronic system of claim 1, wherein the communication session is a video communication session and the controller:

completes setup of the communication session, but pauses communication of visual content to the first electronic device in response to receiving a negative user input from the driver using the first electronic device; and initiates communicating visual content to the first electronic device in response to subsequently receiving an affirmative user input from the driver using the first electronic device.

6. The electronic system of claim 1, wherein:

the one or more sensors capture information about conditions external to the moving vehicle;

the at least one second electronic device comprises at least one output device; and the controller:

receives the information of the conditions external to the moving vehicle;

identifies, from the information, external conditions meeting one or more of the criteria that are representative of at least one challenging driving condition; and communicates a prompt to the at least one second electronic device, the prompt causing the at least one second electronic device to present a notification comprising one or more of an audio output and a visual output via a respective one of the at least one output device, wherein the notification indicates to a respective user of each of the at least one second electronic device that the first electronic device is being used by a driver in moving vehicle with driving conditions meeting one or more of the criteria.

7. The electronic system of claim 1, wherein, to verify that the driver is able to communicate while safely operating the vehicle under the current driving conditions, the controller:

transmits a request, to a navigation application that is one of executed by the first electronic device or communicating with the first electronic device, for data that indicates whether the driver is able to communicate while safely operating the moving vehicle under the current driving conditions;

completes setup of the communication session in response to receiving, from the navigation application, an affirmative response to the request for the data indicating the driver is able to communicate while safely operating the moving vehicle; and discontinues setup of the communication session and activates a timer with a time period for a delayed setup of a communication session in response to receiving, from the navigation application, a negative response to the request.

8. A method comprising:

detecting initiation of setup of a communication session between a first electronic device and at least one second electronic device, via a communication subsystem and a communication network, with the electronic system as host;

receiving data that indicates that the first electronic device is being used by a driver in a moving vehicle;

in response to determining that the first electronic device is being used by a driver in a moving vehicle:

communicating a request for receipt of information identifying whether the driving conditions meet one or more criteria of the following criteria: presence of one or more of snow, rain, haze, wind, or sleet, a road containing turns, an incline/decline, road construction and obstacles, the driving conditions being detected by at least one sensor that detects external conditions to the vehicle;

receiving the information including data related to a current driving condition provided by at least one of the first electronic device and at least one sensor that detects driving conditions with at least one of the one or more criteria;

pausing setup of the communication session to reduce distractions to the driver in response to receipt of the information identifying that the driver is potentially in the driving condition;

requesting data about the first electronic device that indicates whether current driving conditions allow the driver to communicate via the communication session without degrading driving performance, wherein, to verify that the driver is able to communicate while operating the vehicle under the current driving conditions, requesting the data comprises transmitting a request to the first electronic device for a user input that indicates whether the driver is able to communicate while safely operating the vehicle under the current driving conditions;

completing setup of the communication session only in response to verifying that the driver is able to communicate via the communication session while safely operating the vehicle under the current driving conditions, wherein completing the setup of the communication session is performed in response to receiving, from the driver via the first electronic device, an affirmative user input in response to the request for the user input; and disconnecting the first electronic device from a connected communication session, in response to receiving a negative response to the request for user input and rechecks the driving conditions prior to reconnecting the first electronic device to the communication session.

9. The method of claim 8, wherein verifying that the driver is able to communicate while safely operating the vehicle under the current driving conditions comprises:

identifying a geographic location of the first electronic device; and querying one or more of a navigation service and weather service for information of a corresponding one of hazardous traffic conditions and hazardous road conditions at the geographic location.

10. The method of claim 8, further comprising:

discontinuing setup of the communication session and activates a timer with a time period for a delayed setup of a communication session in response to receiving, from the driver via the first electronic device, a negative user input in response to the request for the user input.

11. The method of claim 8, wherein the communication session is a video communication session, the method further comprising:

completing setup of the communication session, but pausing communication of visual content to the first electronic device in response to receiving a negative user input from the driver using the first electronic device;

initiating communicating visual content to the first electronic device in response to subsequently receiving an affirmative user input from the driver using the first electronic device.

12. The method of claim 8, further comprising:

receiving information of conditions external to the moving vehicle captured by the one or more sensors;

identifying, from the information, external conditions meeting one or more of the criteria that are representative of at least one challenging driving condition; and communicating a prompt to the at least one second electronic device, the prompt causing the at least one second electronic device to present a notification comprising one or more of an audio output and a visual output via a respective one of the at least one output device, wherein the notification indicates to a respective user of each of the at least one second electronic device that the first electronic device is being used by a driver in a moving vehicle with driving conditions meeting one or more of the criteria.

13. The method of claim 8, wherein verifying that the driver is able to communicate while safely operating the vehicle under the current driving conditions comprises:

transmitting a request, to a navigation application that is one of executed by the first electronic device or communicating with the first electronic device, for data that indicates whether the driver is able to communicate while safely operating the vehicle under the current driving conditions;

completing setup of the communication session in response to receiving, from the navigation application, an affirmative response to the request for the data indicating the driver is able to communicate while safely operating the moving vehicle; and discontinuing setup of the communication session and activates a timer with a time period for a delayed setup of a communication session in response to receiving, from the navigation application, a negative response to the request.

14. A computer program product comprising:

a non-tangible computer readable storage device; and program code on the computer readable storage device that when executed by a processor associated with an electronic system, the program code enables the electronic system to provide functionality of:

detecting initiation of setup of a communication session between a first electronic device and at least one second electronic device, via a communication subsystem and a communication network, with the electronic system as host;

receiving data that indicates that the first electronic device is being used by a driver in a moving vehicle;

in response to determining that the first electronic device is being used by a driver in a moving vehicle:

communicating a request for receipt of information identifying whether the driving conditions meet one or more criteria of the following criteria: presence of one or more of snow, rain, haze, wind, or sleet, a road containing turns, an incline/decline, road construction and obstacles, the driving conditions being detected by at least one sensor that detects external conditions to the vehicle;

receiving the information including data related to a current driving condition provided by at least one of the first electronic device and the at least one sensors that detect driving conditions with at least one of the one or more criteria;

pausing setup of the communication session to reduce distractions to the driver in response to receipt of the information identifying that the driver is potentially in the driving condition;

requesting data about the first electronic device that indicates whether current driving conditions allow the driver to communicate via the communication session without degrading driving performance; and completing setup of the communication session only in response to verifying that the driver is able to communicate via the communication session while safely operating the vehicle under the current driving conditions, wherein completing the setup of the communication session is performed in response to receiving, from the driver via the first electronic device, an affirmative user input in response to the request for the user input; and disconnecting the first electronic device from a connected communication session, in response to receiving a negative response to the request for user input and rechecking the driving conditions prior to reconnecting the first electronic device to the communication session.

15. The electronic system of claim 6, wherein:

the at least one sensor comprises an image capturing device that captures an image stream of conditions external to the moving vehicle;

the at least one output device comprises a display device; and the controller:

receives, within the received information, the image stream of conditions external to the moving vehicle;

analyzes the image stream to identify and determine the external conditions meet the one or more criteria that are representative of at least one challenging driving condition; and in response to determining that the external conditions in the image stream are representative of the one or more criteria, automatically communicates, to the at least one second electronic device, a notification that triggers output of a visual image of the image stream on the display device of the at least one second electronic device to enable a respective user of the at least one second electronic device to receive a visual experience of a severity of the challenging driving conditions intuitively and in real-time.

16. The electronic system of claim 1, wherein the controller:

presents a screen share window with visual content to each second participant of the communication session via respective one of the at least one second electronic device; and presents within the screen share window, to the second participants not currently having driving conditions that meet the one or more criteria, a notification indicating which participants are prevented from viewing the content due to being in a driving condition meeting the one or more criteria.

17. The method of claim 12, wherein:

the at least one sensor comprises an image capturing device that captures an image stream of conditions external to the moving vehicle;

the at least one output device comprises a display device; and the method further comprises:

receiving, within the received information, the image stream of conditions external to the moving vehicle;

analyzing the image stream to identify and determine the external conditions that meet the one or more criteria, which are representative of at least one challenging driving condition; and communicating to the at least one second electronic device, a notification that triggers output of a visual image that is presented visually on the display device to a respective user of the at least one second electronic device, in response to determining that the external conditions in the image stream are representative of the one or more criteria, automatically communicating, to the at least one second electronic device, a notification that triggers output of a visual image of the image stream on the display device of the at least one second electronic device to enable a respective user of the at least one second electronic device to receive a visual experience of a severity of the challenging driving conditions intuitively and in real-time.

18. The method of claim 8, further comprising:

presenting a screen share window with visual content to each second participant of the communication session via respective one of the at least one second electronic device; and presenting within the screen share window, to the second participants not currently having driving conditions that meet the one or more criteria, a notification indicating which participants are prevented from viewing the content due to being in a driving condition meeting the one or more criteria.

19. The computer program product of claim 14, wherein the program code enables the electronic system to provide functionality of:

receiving, within the received information, an image stream captured by an image capturing device of the first electronic device, of conditions external to the moving vehicle, the image capturing device operating as one of the one or more sensors;

analyzing the image stream to identify and determine the external conditions that are representative of at least one driving conditions that meet the one or more criteria; and in response to determining that the external conditions in the image stream are representative of the at least one driving condition that meet the one or more criteria, automatically communicating to the at least one second electronic device, a notification of a driving condition of the first user that triggers output of a visual image of the image stream on a display device of the at least one second device for visual presentation to a respective user of the at least one second electronic device to enable the respective user of the at least one second electronic device to receive a visual experience of a severity of the challenging driving conditions intuitively and in real-time.

20. The computer program product of claim 14, wherein the program code enables the electronic system to provide functionality of:

presenting a screen share window with visual content to each second participant of the communication session via respective one of the at least one second electronic device; and presenting within the screen share window, to the second participants not currently having driving conditions that meet the one or more criteria, a notification indicating which participants are prevented from viewing the content due to being in a driving condition meeting the one or more criteria.

\* \* \* \* \*